(12) United States Patent
Zhang et al.

(10) Patent No.: US 11,223,285 B2
(45) Date of Patent: Jan. 11, 2022

(54) DC-DC CONVERSION SYSTEM AND CONTROL METHOD OF DC-DC CONVERSION SYSTEM

(71) Applicant: Delta Electronics (Shanghai) Co., Ltd., Shanghai (CN)

(72) Inventors: Yi Zhang, Shanghai (CN); Er-Dong Chen, Shanghai (CN); Hong-Wei Xiao, Shanghai (CN); Zhao Wang, Shanghai (CN); Pian Zhou, Shanghai (CN); Jian-Ping Ying, Shanghai (CN); Teng Liu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/817,586

(22) Filed: Mar. 12, 2020

(65) Prior Publication Data
US 2020/0295664 A1      Sep. 17, 2020

(30) Foreign Application Priority Data

Mar. 14, 2019   (CN) .......................... 201910193266.5
Mar. 9, 2020    (CN) .......................... 202010156924.6

(51) Int. Cl.
*H02M 3/335*    (2006.01)

(52) U.S. Cl.
CPC ............................... *H02M 3/33569* (2013.01)

(58) Field of Classification Search
CPC ....... H02M 2001/0074; H02M 7/5387; H02M 1/00; H02M 1/32; H02M 1/42; H02M 2001/0058; H02M 2001/007; H02M 2001/0077; H02M 3/285; H02M 3/33569; H02M 3/33584; H02M 5/458; H02M 5/4585; H02M 7/487; H02M 7/49
See application file for complete search history.

(56) References Cited

U.S. PATENT DOCUMENTS

| | | |
|---|---|---|
| 6,052,293 A | 4/2000 | Ivner et al. |
| 9,893,633 B1 | 2/2018 | Li et al. |
| 2012/0007431 A1 | 1/2012 | Yungtaek et al. |

FOREIGN PATENT DOCUMENTS

| | | |
|---|---|---|
| CN | 101345490 A | 1/2009 |
| CN | 102013826 A | 4/2011 |
| CN | 101345490 B | 1/2012 |
| CN | 103312150 A | 9/2013 |

(Continued)

*Primary Examiner* — Nguyen Tran
(74) *Attorney, Agent, or Firm* — CKC & Partners Co., LLC

(57) ABSTRACT

A method for controlling a DC-DC conversion system having power conversion modules, input sensors, an output sensor and a controller, in which each of the power conversion modules has one or more conversion units. The output sensor detects an output signal of the DC-DC conversion system. The input sensors detect input voltage signals located at series-connected first sides of one or more conversion units respectively. The controller receives the output signal and the input voltage signals. The controller generates a first control signal according to the output signal and an output reference signal. The controller generates second control signals according to the input voltage signals and input reference voltage signals. The controller outputs a modulation signal corresponding to a corresponding one of the second control signals according to the first control signal and the corresponding second control signal, to control switches of a corresponding conversion unit.

24 Claims, 16 Drawing Sheets

(56) References Cited

FOREIGN PATENT DOCUMENTS

| | | |
|---|---|---|
| CN | 104518661 A | 4/2015 |
| CN | 103269177 B | 6/2015 |
| CN | 205104958 U | 3/2016 |
| CN | 106100346 A | 11/2016 |
| CN | 106357109 A | 1/2017 |
| CN | 105576981 B | 1/2018 |
| CN | 104980015 B | 4/2018 |
| EP | 0886912 B1 | 7/2002 |
| WO | 97/22174 A1 | 6/1997 |
| WO | 2015/015885 A1 | 2/2015 |

DC-DC CONVERSION SYSTEM AND CONTROL METHOD OF DC-DC CONVERSION SYSTEM

RELATED APPLICATION

The present application claims priority to China Application Serial Number 202010156924.6, filed Mar. 9, 2020 and China Application Serial Number 201910193266.5, filed Mar. 14, 2019, which is incorporated herein by reference in its entirety.

BACKGROUND

Technical Field

The present disclosure relates to a circuit and a control method. More particularly, the present disclosure relates to a DC-DC conversion system and a DC conversion system control method.

Description of Related Art

In the DC-DC conversion system, to ensure that the DC-DC conversion system can work stably, the voltage of each power conversion module connected in series should be equalized, and the current of each power conversion module connected in parallel should be equalized.

If voltage disequilibrium occurs, component selection and thermal design will be affected, and the performance and operation reliability of the system will be reduced easily. Therefore, the way to ensure the voltage equalization has become one of an important issue in this field.

SUMMARY

In order to solve the foregoing problems, one aspect of the present disclosure is related to a DC-DC conversion system which includes a plurality of power conversion modules, an output sensor, a plurality of input sensors, and a controller. Each of the plurality of power conversion modules includes at least one conversion unit, and each of the conversion units includes a first side and a second side, in which the first sides of the conversion units are connected in series, and the second sides of the conversion units are connected in parallel. The output sensor is configured to detect an output signal of the DC-DC conversion system. The input sensors are configured to detect a plurality of input voltage signals of the first sides of the conversion units, respectively. The controller is coupled to the conversion units, the input sensors, and the output sensor, in which the controller is configured to output a modulation signal to control a plurality of switches of the corresponding one of the conversion units according to a first control signal and the corresponding one of a plurality of second control signals. The first control signal is associated with the output signal and an output reference signal, and the plurality of second control signal is associated with the input voltage signals and a plurality of input reference voltage signals.

Another aspect of the present disclosure is related to a method for controlling a DC-DC conversion system having a plurality of power conversion modules, a plurality of input sensors, an output sensor and a controller, in which each of the plurality of power conversion modules has one or more conversion units. An output signal of the DC-DC conversion system is detected by the output sensor. A plurality of input voltage signals, located at a plurality of series-connected first sides of one or more conversion units respectively, are detected by the plurality of input sensors. The output signal and the plurality of input voltage signals are received by the controller. A first control signal is generated by the controller, according to the output signal and an output reference signal. A plurality of second control signals are generated by the controller, according to the plurality of input voltage signals and a plurality of input reference voltage signals. A modulation signal corresponding to a corresponding second control signal of the plurality of second control signals is outputted by the controller, according to the first control signal and the corresponding second control signal, to control a plurality of switches of a corresponding conversion unit of the conversion units.

Another aspect of the present disclosure is related to a decoupling method for a total output signal control loop and a voltage equalization control loop in a DC-DC conversion system, the total output signal control loop is configured to generate a first control signal, and the voltage equalization control loop is configured to generate a number of second control signals. Second control signals are detected by a controller. Whether all of the second control signals are out of a coupling tolerance range is determined by the controller. The first control signal and the second control signals are compensated by the controller when all of the second control signals are out of the coupling tolerance range, in which a direction of the first control signal, compensated by the controller, is opposite from a direction of the second control signals compensated by the controller.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
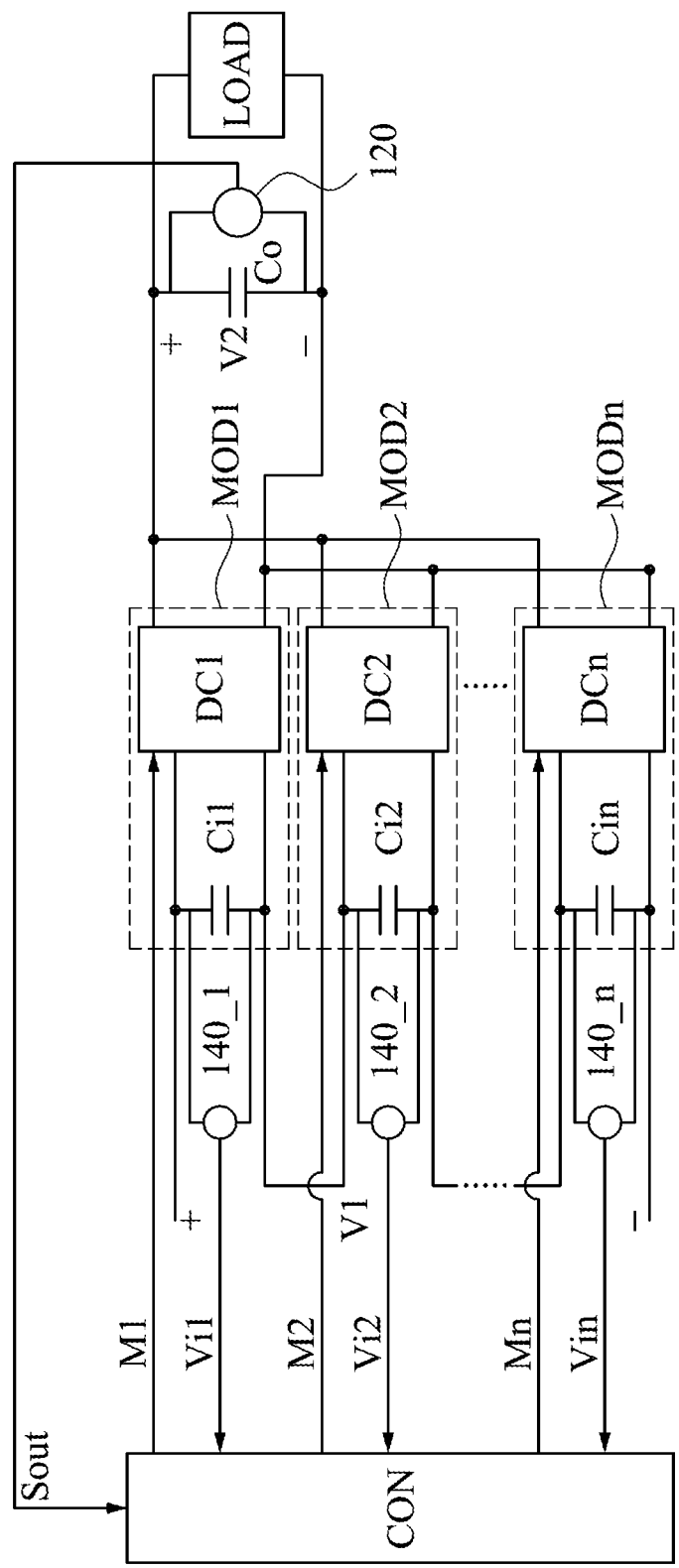
FIG. 1 is a schematic diagram illustrating a DC-DC conversion system, in accordance with some embodiments of the present disclosure.

Reference will now be made in detail to the present embodiments of the disclosure, examples of which are illustrated in the accompanying drawings. Wherever possible, the same reference numbers or symbols are used in the drawings and the description to refer to the same or like parts.

It will be understood that, although the terms first, second, third etc. may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present disclosure.

The terms herein are used for describing particular embodiments and are not intended to be limited thereto. Single forms such as "a", "this", "the", as used herein also include the plurality form.

In the description herein and throughout the claims that follow, the terms "coupled" or "connected" in this document may be used to indicate that two or more elements physically or electrically contact with each other, directly or indirectly. They may also be used to indicate that two or more elements cooperate or interact with each other.

In the description herein and throughout the claims that follow, the terms "comprise" or "comprising," "include" or "including," "have" or "having," "contain" or "containing" and the like used herein are to be understood to be open-ended, i.e., to mean including but not limited to.

In the description herein and throughout the claims that follow, the phrase "and/or" includes any and all combinations of one or more of the associated listed claims.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference is now made to FIG. 1. FIG. 1 is a schematic diagram illustrating a DC-DC conversion system, in accordance with some embodiments of the present disclosure. As shown in FIG. 1, a DC-DC conversion system 100 has a DC-DC conversion circuit structure with first sides connected in series and second sides connected in parallel. In some embodiments, the first sides are high voltage sides, in which the high voltage sides may be input sides, and the second sides are low voltage sides, in which the low voltage side may be output sides. In some other embodiments, the high voltage sides may be output sides and the low voltage sides may be input sides. For simplicity of illustration, the following description will be described with embodiments of input-series-output-parallel (ISOP), but the present disclosure is not limited thereto.

The DC-DC conversion system 100 includes a number of (e.g., n) power conversion modules MOD1~MODn, an output sensor 120, a number of (e.g., n) input sensors 140_1~140_n (such as voltage sensor or other sensor capable of detecting the input voltage signal), a controller CON, and a load LOAD, in which n is a positive integer. Each of the power conversion modules MOD1~MODn includes at least one of the conversion units DC1~DCn. Each of the conversion units DC1~DCn includes a first side and a second side. In some embodiments, the power conversion modules may include a conversion unit. In some other embodiments, the power conversion modules may include two or more conversion units.

Structurally, as shown in FIG. 1, the first sides of the conversion units DC1~DCn are connected to each other in series. The second sides of the conversion units DC1~DCn are connected to each other in parallel. The input voltage sensors 140_1~140_n are coupled to the first side of the conversion units DC1~DCn respectively. The output sensor 120 is coupled to the second sides of the conversion units DC1~DCn, that is, the output side of the DC-DC conversion system. The controller CON is coupled to the input voltage sensors 140_1~140_n, the output sensor 120, and the conversion units DC1~DCn. The load LOAD is coupled between the positive and the negative voltage terminals of the second sides of the conversion units DC1~DCn.

Figure 3:
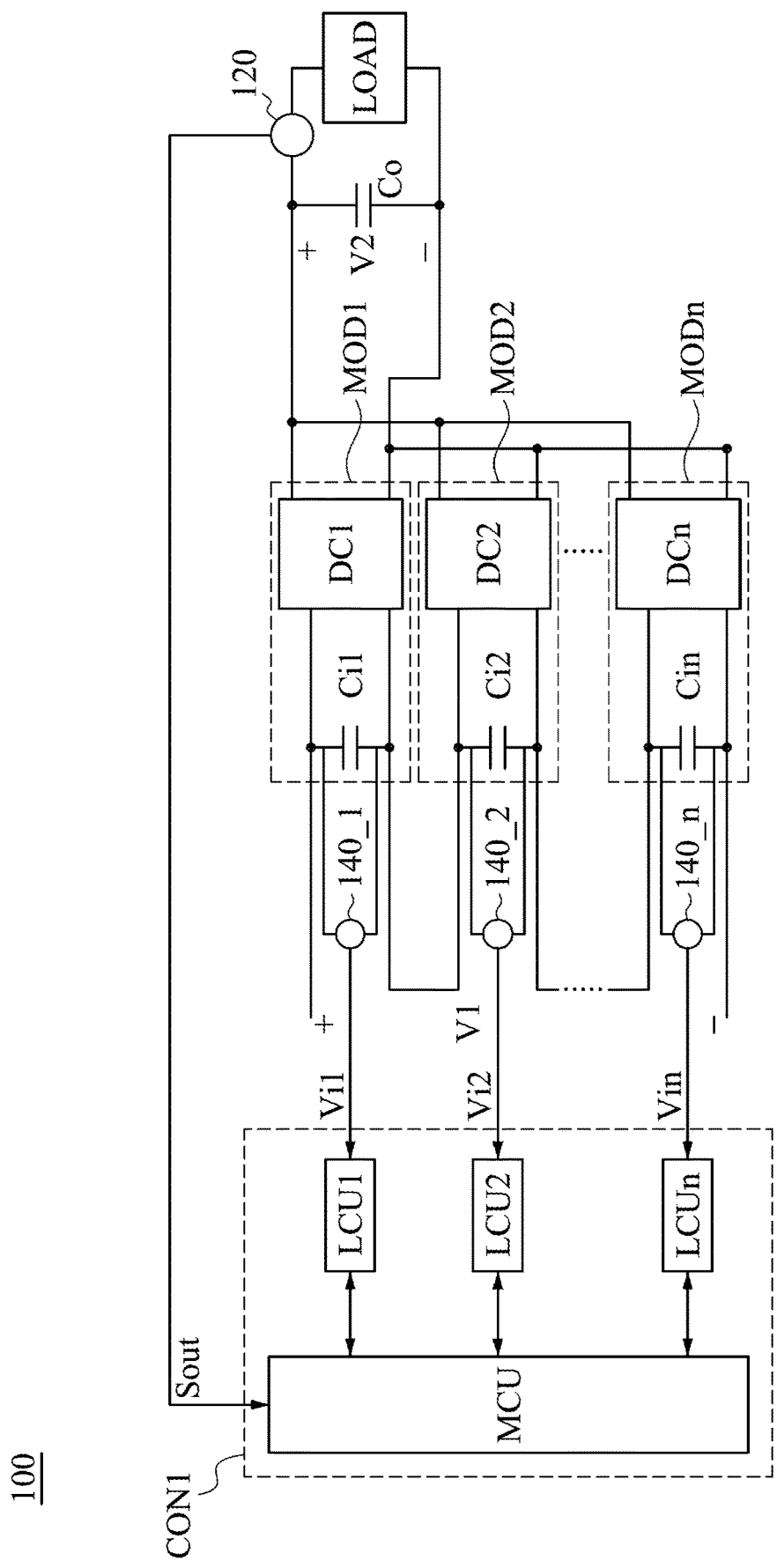
FIG. 3 is a schematic diagram illustrating a DC-DC conversion system, in accordance with some embodiments of the present disclosure.

Specifically, each first side of the conversion units DC1~DCn connected in series is a high voltage side V1, and each second side of the conversion units DC1~DCn connected in parallel is a low voltage side V2. Each conversion unit includes a capacitor, and the capacitor is connected to the first sides of the conversion units in parallel, for example, the conversion unit DC1 includes a capacitor Ci1, the capacitor Ci1 is connected to the first side of the conversion unit DC1, and the conversion unit DCn includes a capacitor Cin, the capacitor Cin is connected to the first side of the conversion unit. The input voltage sensors 140_1~140_n are coupled to two terminals of the capacitors Ci1~Cin respectively (e.g., the input voltage sensor 140_1 is coupled to two terminals of the capacitor Ci1). In addition, an output capacitor Co is coupled between a positive voltage terminal and a negative voltage terminal of the output side of the DC-DC conversion system, that is, positive voltage terminals and negative voltage terminals of the second sides of the conversion units DC1~DCn. In some embodiments, the output sensor 120 may be coupled to two terminals of the output capacitor Co, to measure an output voltage V2 of the low voltage side (as shown in FIG. 1). In some other embodiments, the output sensor 120 may be coupled to any terminal of the output side of the DC-DC conversion system, to measure an output current (as shown in FIG. 3). In some other embodiments, the output sensor 120 is coupled to any terminal of the output side of the DC-DC conversion system and two terminals of the output capacitor Co, to measure an output power.

Operationally, as shown in FIG. 1, the output sensor 120 is configured to measure an output signal Sout of the DC-DC conversion system 100. The output signal Sout may be an output current signal, an output voltage signal or an output power signal. The input voltage sensors 140_1~140_n are configured to measure a number of input voltage signals Vi1~Vin of the conversion unit DC1~DCn respectively. The controller CON is configured to receive the output signal Sout and the input voltage signals Vi1~Vin, and generate modulation signals M1~Mn to the conversion units DC1~DCn corresponding to the input voltage signals. A number of switches of the conversion units DC1~DCn operate according to the modulation signals M1~Mn corresponding to the conversion unit respectively.

As such, by the conversion units DC1~DCn in each of the power conversion modules MOD1~MODn transmitting the input voltage signals Vi1~Vin to the controller CON, the controller CON can determine a current amount of the conversion units DC1~DCn in the power conversion modules MOD1~MODn according to the input voltage signals Vi1~Vin, and generate the modulation signals M1~Mn through calculation to feedback to the switches of the conversion units DC1~DCn in the corresponding power conversion module of the power conversion modules MOD1~MODn.

In some embodiments, the controller CON may be implemented by various processing circuits, a digital signal processor (DSP), a complex programmable logic device (CPLD), a field-programmable gate array (FPGA), etc. In some embodiments, the modulation signal may be a frequency modulation (FM) signal, or a pulse width modulation (PWM) signal.

To be noticed, the index 1~n used in signal symbols and component symbols in the specification and the figures of the present disclosure, are only used to describe separate component and signal, but are not intended to be limited to particular amount. In the present disclosure, if a symbol of a component or a signal is not specified with an index, it means that the symbol of the component or the signal is designated as any unparticular component or signal in the component group or the signal group. For example, the component symbol DC1 is designated as the conversion unit DC1, and the component symbol DC is designated as any unparticular conversion unit in conversion unit DC1~DCn. As another example, the component symbol 140_1 is designated as the input voltage sensor 140_1, and the component symbol 140 is designated as any unparticular input voltage sensor in input voltage sensors 140_1~140_n. Still another example, the symbol Vi1 is designated as the input voltage signal Vi1, and the signal symbol Vi is designated as any unparticular input voltage signal in input voltage signal Vi1~Vin.

Figure 2A:
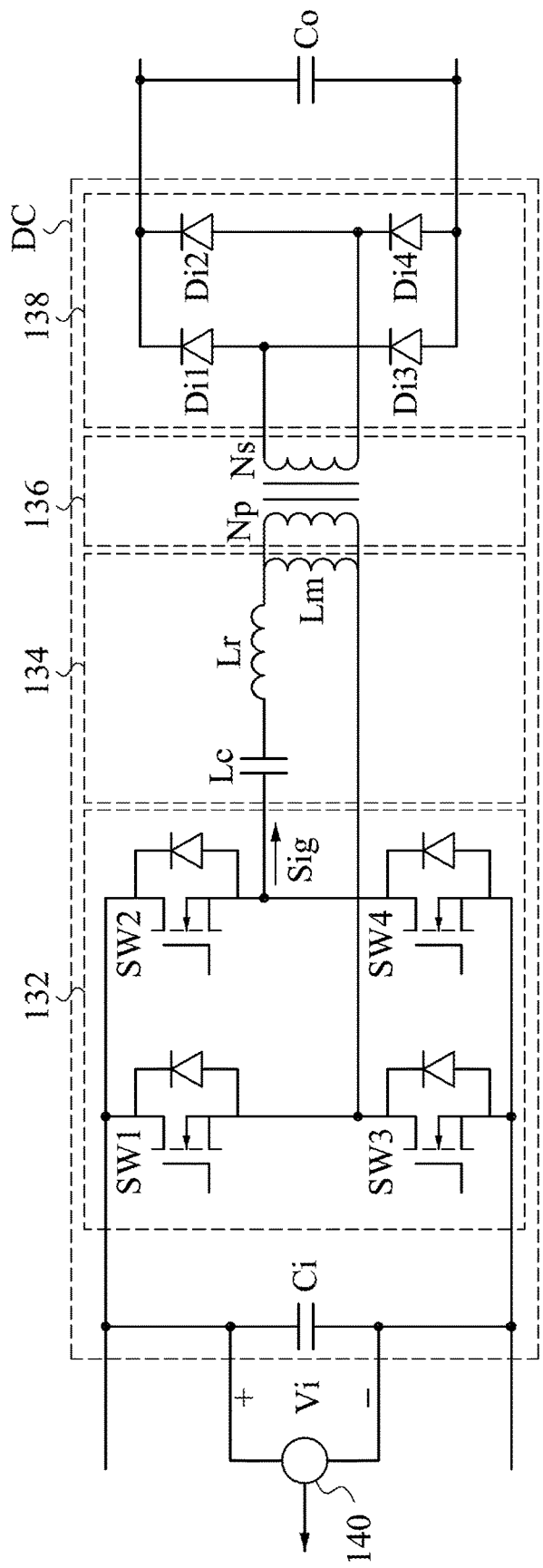
FIG. 2A and FIG. 2B are schematic diagrams illustrating a power conversion module, in accordance with some embodiments of the present disclosure.
Figure 2B:
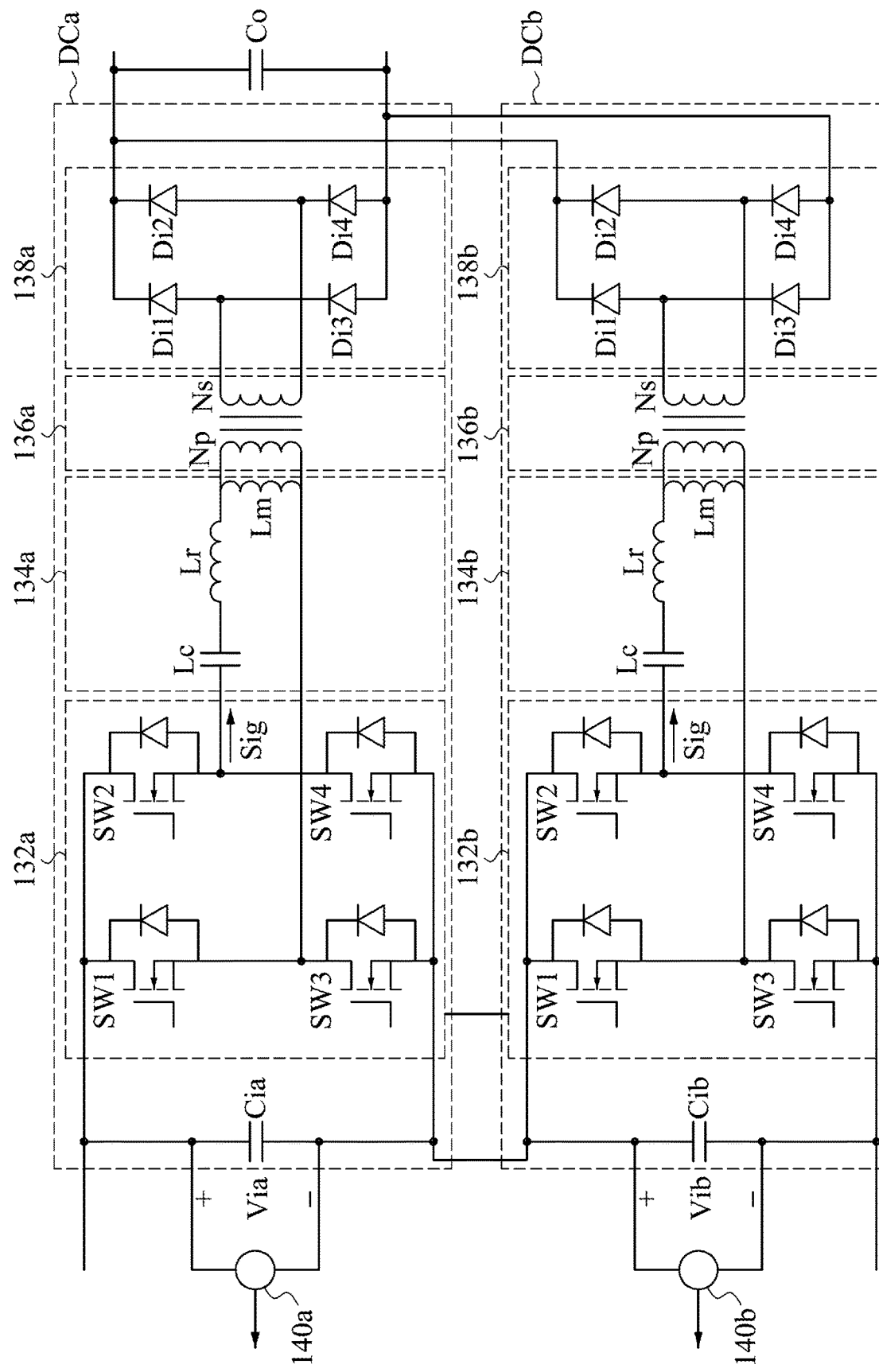

Reference is now made to FIG. 2A and FIG. 2B. FIG. 2A and FIG. 2B are schematic diagrams illustrating a power conversion module DC, in accordance with some embodiments of the present disclosure. As shown in FIG. 2A, each conversion unit DC includes a DC conversion module, in which the DC conversion module includes a full bridge inverter circuit 132, a resonant circuit 134, a transformer 136 and a rectifier circuit 138. In some embodiments, the full bridge inverter circuit 132 includes a number of switches, while the present disclosure is not limited to the amount and the way of connection.

Structurally, an input terminal of the full bridge inverter circuit 132 is the first side of the conversion unit DC, and the capacitor Ci is connected to the input terminal of the full bridge inverter circuit 132 in parallel. The input terminal of the full bridge inverter circuit 132 is configured to receive the voltage Vi of the high voltage side V1. The input voltage sensor 140 is coupled to the two terminals of the input capacitor Ci, and is configured to measure the voltage Vi between the two terminals of the capacitor Ci, and output the measured voltage Vi to the controller CON. The output terminal of the full bridge inverter circuit 132 is electrically coupled to the resonant circuit 134, and is configured to output to the resonant circuit 134 an AC signal Sig converted from the DC voltage Vi through the full bridge inverter circuit 132. The resonant circuit 134 is also electrically coupled to a primary side of the transformer 136. The input terminal of the rectifier circuit 138 is electrically coupled to a secondary side of the transformer 136. The output terminal of the rectifier circuit 138 is electrically coupled to an output capacitor Co, to provide a DC output voltage to the load or other post-stage circuit. In other words, the resonant circuit 134 is coupled between the AC side of the full bridge inverter circuit 132 and a primary winding Np of the transformer 136. A secondary winding Ns of the transformer 136 is connected to the input side of the rectifier circuit 138. The DC side of the full bridge inverter circuit 132 is the first side of the DC conversion module, that is, the DC side of the full bridge inverter circuit 132 is the first side of the conversion unit. The output side of the rectifier circuit 138 is the second side of the DC conversion module, that is, the output side of the rectifier circuit 138 is the output side of the DC-DC conversion system.

In some embodiments, as shown in FIG. 2A, the full bridge inverter circuit 132 includes switches SW1~SW4. The resonant circuit 134 includes a resonant capacitor Lc, a resonant inductor Lr, and a magnetizing Inductor Lm. The primary side of the transformer 136 may include a set of primary winding Np, and the secondary side may include a set of secondary winding Ns. The rectifier circuit 138 may be a full bridge rectifier circuit, including diodes Di1~Di4.

In particular, the first ends of switches SW1 and SW2 are electrically coupled to a positive terminal of the voltage Vi (which is also a positive terminal of the first side of the full bridge inverter circuit 132), and the second ends of switches SW1 and SW2 are electrically coupled to the resonant circuit 134. The first ends of switches SW3 and SW4 are electrically coupled to the second ends of switches SW1 and SW2 respectively, and the second ends of switches SW3 and SW4 are electrically coupled to the negative terminal of the voltage Vi (which is also a negative terminal of the first side of the full bridge inverter circuit 132). Control ends of the switches SW1~SW4 are configured to receive the modulation signals, such that the switches SW1~SW4 can be selectively on or off according to the modulation signals. Accordingly, the full bridge inverter circuit 132 can output the AC signal Sig by control the switches SW1~SW4.

The resonant capacitor Lc, the resonant inductor Lr, and the primary winding Np of the transformer 136 are connected to each other in series. The magnetizing Inductor Lm and the primary winding Np of the transformer 136 are connected in parallel. The anode of the diode Di1 and the cathode of the diode Di3 are electrically coupled to the first side of the secondary winding Ns. The anode of the diode Di2 and the cathode of the diode Di4 are electrically coupled to the second side of the secondary winding Ns. The cathodes of the diodes Di1 and Di2 are electrically coupled to the positive terminal of the output capacitor Co. The anodes of the diodes Di3 and Di4 are electrically coupled to the negative terminal of the output capacitor Co.

In some other embodiments, as shown in FIG. 2B, each power conversion module MOD includes two conversion units DCa and DCb, in which each of the conversion units DCa and DCb includes a DC conversion module with the full bridge inverter circuit 132, the resonant circuit 134, the transformer 136, and the rectifier circuit 138 (though there are only two conversion units DCa and DCb illustrated in embodiments of FIG. 2B, the present disclosure is not limited thereto). In embodiments of FIG. 2B, components similar to those in the embodiments of FIG. 2A are represented by the same component symbols, and the similar operations described in the previous paragraph will be omitted for the sake of brevity. Compare to the embodiments of FIG. 2A, the power conversion module MOD includes full bridge inverter circuits 132a and 132b, resonant circuits 134a and 134b, transformers 136a and 136b, and rectifier circuits 138a and 138b in this embodiment. Structurally, the full bridge inverter circuit 132a and 132b are connected to each other in series, the rectifier circuit 138a and 138b are connected to each other in parallel. The capacitor Cia is connected to the first side of the full bridge inverter circuit 132a in parallel. The input voltage sensor 140a is configured to measure the voltage Via between two terminals of the capacitor Cia. Similarly, the capacitor Cib is connected to the first side of the full bridge inverter circuit 132b. The input voltage sensor 140b is configured to measure the voltage Vib between two terminals of the capacitor Cib.

To be noticed, the aforementioned embodiments of the circuit are not intended to limit the scope of the present disclosure. For example, the resonant circuit 134 may implement LC resonant circuit, LCC resonant circuit, or LLCC resonant circuit by one or more groups of inductor unit and capacitor unit. Therefore, the LLC resonant circuit illustrated in figures of the present disclosure is merely one of the possible embodiments, which is not intended to limit the scope of the present disclosure. Alternatively stated, resonant circuits, transformers and rectifier circuits in various embodiments of the present disclosure can be implemented by any form known by people skilled in art.

Reference is now made to FIG. 3. FIG. 3 is a schematic diagram illustrating a DC-DC conversion system 100, in accordance with some embodiments of the present disclosure. In embodiments of FIG. 3, components similar to those in the embodiments of FIG. 1 are represented by the same component symbols, and the similar operations described in the previous paragraph will be omitted for the sake of brevity. Compare to the embodiments of FIG. 1, the controller CON1 includes a controller MCU and a number of local controllers LCU1~LCUn in this embodiment. For simplicity of illustration, only three local controllers are illustrated in FIG. 3, but the amount of local controllers is not limited thereto.

Structurally, the main controller MCU is coupled to the output sensor 120 and the local controllers LCU1~LCUn. Each of the local controllers LCU1~LCUn is coupled to the corresponding power conversion module of the power conversion modules MOD1~MODn respectively (e.g., the local controller LCU1 is couple to the power conversion module MOD1). Each of the local controllers LCU1~LCUn is coupled to the corresponding input voltage sensor of the input voltage sensors 140_1~140_n respectively (e.g., the local controller LCU1 is coupled to the input voltage sensor 140_1). The local controllers LCU1~LCUn are coupled to the main controller MCU.

Operationally, each of the local controllers LCU1~LCUn is configured to receive the corresponding input voltage signal of the input voltage signals Vi1~Vin from the corresponding input voltage sensor of the input voltage sensors 140_1~140_n, and is configured to output the input voltage signals Vi1~Vin to the main controller MCU. The main controller MCU is configured to receive the input voltage signals Vi1~Vin, and receive the output signal Sout from the output sensor 120. The main controller MCU generates the input reference voltage signals according to the input voltage signals Vi1~Vin received. Afterwards, the main controller MCU and the local controllers LCU1~LCUn are configured to generate a first control signal and a second control signal according to the output signal Sout, the input voltage signals Vi1~Vin and the output reference signal, and output the modulation signal to control the switches in the conversion unit to operate according to the first control signal and the second control signal. The detail of operations will be described in the following paragraphs.

Figure 4:
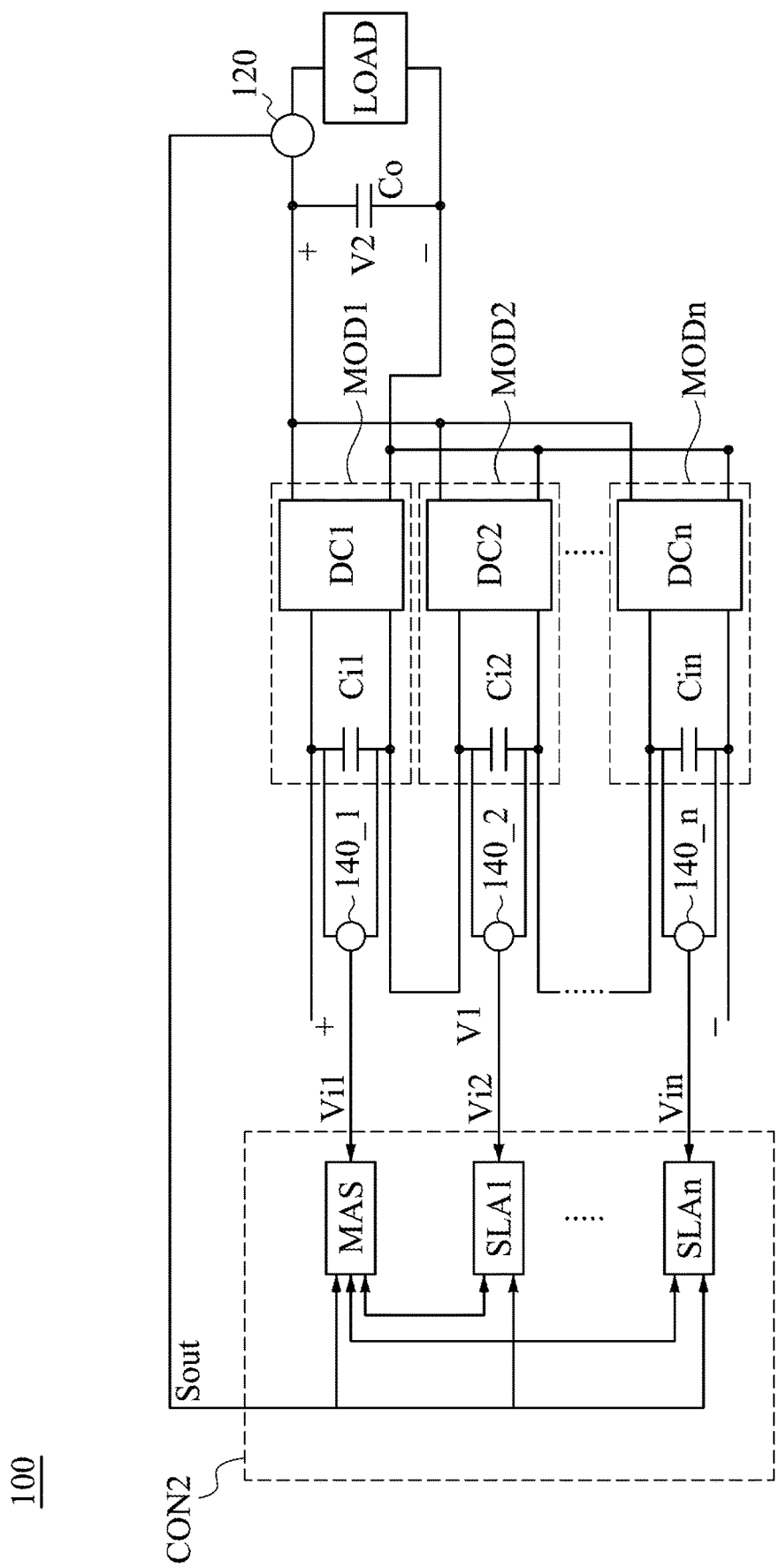
FIG. 4 is a schematic diagram illustrating another DC-DC conversion system, in accordance with some other embodiments of the present disclosure.

Reference is now made to FIG. 4. FIG. 4 is a schematic diagram illustrating another DC-DC conversion system 100, in accordance with some other embodiments of the present disclosure. In embodiments of FIG. 4, same component symbols are used to refer to similar components in the embodiments of FIG. 1 and FIG. 3, and the same operations described in the previous paragraphs will be omitted for the sake of brevity. Compare to the embodiments of FIG. 3, the controller CON2 includes a number of local controllers MAS and SLA1~SLAn in this embodiment. For simplicity of illustration, only three local controllers are illustrated in FIG. 4, but the amount of local controllers is not limited thereto.

Structurally, the local controllers MAS and SLA1~SLAn are electrically couple to each other. Specifically, the local controllers included in the controller CON2 are in a master-slave structure. Operationally, one of the local controllers is defined as the master, which is operated to perform main control, and other local controllers are defined as the slaves. As such, the master can be optionally switched according to actual situation and requirement to have better redundancy.

Specifically, after deciding the master, each of the local controllers SLA1~SLAn is configured to receive the corresponding input voltage signal of the input voltage signals Vi2~Vin respectively from the corresponding input voltage sensor of the input voltage sensors 140_2~140_n, and output the input voltage signals Vi2~Vin to the local controller MAS which is the master. The local controller MAS is configured to receive the output signal Sout from the output sensor 120, and receive the input voltage signal Vi1 by the corresponding input voltage sensor 140_1, and receive the input voltage signals Vi2~Vin from other local controllers SLA1~SLAn. After that, the local controllers MAS and SLA1~SLAn are configured to generate the first control signal and the second control signals according to the output signal Sout, the input voltage signals Vi1~Vin and the output reference signal, and output the modulation signal according to the first control signal and the second control signals to control the switches in the conversion unit to act. The operations in detail will be described in the following paragraphs.

Since the hardware parameters in the power conversion modules MOD1~MODn may be different which will cause voltage disequilibrium on the input sides. In addition, the wider range of input voltage or output voltage may cause the more severe problem of the voltage disequilibrium. Therefore, to stabilize the DC-DC conversion system 100, voltage-equalization and current-equalization of the power conversion module MOD1~MODn should be ensured.

Figure 5:
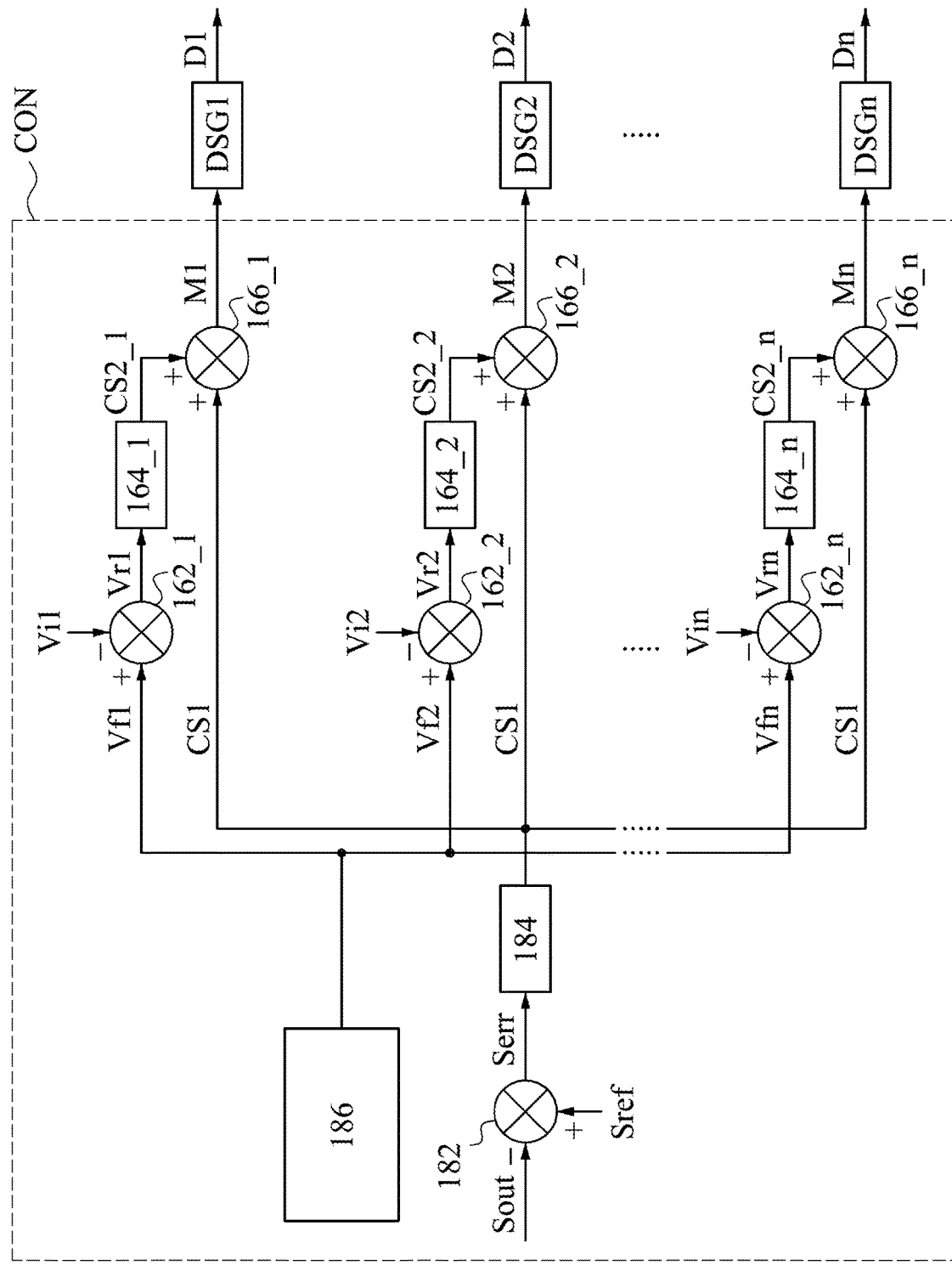
FIG. 5 is a schematic diagram illustrating a controller, in accordance with some embodiments of the present disclosure.

Reference is now made to FIG. 5. FIG. 5 is a schematic diagram illustrating the controller CON, in accordance with some embodiments of the present disclosure. As shown in FIG. 5, the controller CON includes the error units 162_1~162_n, voltage stabilization control units 164_1~164_n, the adding units 166_1~166_n, the error unit 182, the voltage stabilization control unit 184 and the input reference voltage signal generator 186.

In some embodiments, the error unit 182 receives the output signal Sout, and subtracts the output signal Sout from the output reference signal Sref to get an output error value Serr. Then, the voltage stabilization control unit 184 receives the output error value Serr and generates the first control signal CS1 according to the output error value Serr. On the other hand, the input reference voltage signal generator 186 generates the corresponding input reference voltage signal of the input reference voltage signals Vf1~Vfn according to the input voltage signals Vi1~Vin. Afterwards, each of the error units 162_1~162_n receives the corresponding input voltage signal of the input voltage signals Vi1~Vin and the corresponding input reference voltage signal of the input reference voltage signals Vf1~Vfn respectively, and subtracts the corresponding one of the input voltage signals Vi1~Vin from the corresponding input reference voltage signal of the input reference voltage signals Vf1~Vfn to get the corresponding voltage error value of the voltage error values Vr1~Vrn. After that, each of the voltage stabilization control units 164_1~164_n receives the corresponding voltage error value of the voltage error values Vr1~Vrn, and performs voltage-equalization according to the corresponding voltage error value of the voltage error values Vr1~Vrn to generate the corresponding the second control signal of the second control signals CS2_1~CS2_n. The detail operations of the voltage-equalization will be described in the following paragraphs.

Afterwards, each of the adding units 166_1~166_n receives the first control signal CS1 and the corresponding second control signal of second control signals CS2_1~CS2_n respectively, and adds the first control signal CS1 and the corresponding second control signal of second control signals CS2_1~CS2_n to get the corresponding modulation signals M1~Mn. And then, the controller CON outputs the modulation signals M1~Mn to the corresponding driving signal generator of the driving signal generators DSG1~DSGn respectively. The driving signal generators DSG1~DSGn generate the corresponding driving signal of the driving signals D1~Dn according to the corresponding modulation signal of the modulation signals M1~Mn, and output the corresponding driving signal of the driving signals D1~Dn to the switches of the full bridge inverter circuit 132 in the corresponding conversion unit of the conversion units DC1~DCn. The switches of the full bridge inverter circuit 132 can selectively turn on or turn off according to the corresponding driving signal of the driving signals D1~Dn.

Through the operations of the controller CON described above, the conversion units DC1~DCn can be feedback-controlled according to the output signal Sout and the input voltage signals Vi1~Vin, to stabilize and equalize the voltage of the DC-DC conversion system 100.

In addition, by deriving an equivalent circuit model, it should be understood that when the number of the conversion units DC1~DCn connected in series or in parallel, which are in the DC-DC conversion system 100, is more than 2 (i.e., n>2), the voltage equalization control loop configured to generate the second control signals CS2_1~CS2_n would not be affected by the total output signal control loop configured to generate the first control signal CS1, but the total output signal control loop would be affected by the voltage equalization control loop. In other words, due to the coupling of the voltage equalization control loop to the total output signal control loop, the operation of the total output signal control loop will be suppressed. Therefore, to avoid this problem, the total output signal control loop should be speeded up, and the voltage equalization control loop should be slowed down, to reduce the adverse impact of coupling. Accordingly, in some embodiments, the controller CON will ensure that the responding speed of the total output signal control loop is higher than the responding speed of the voltage equalization control loop. For example, the gain crossover frequency of the voltage equalization control loop is lower than half of the gain crossover frequency of the total output signal control loop, by the controller CON.

Figure 14:
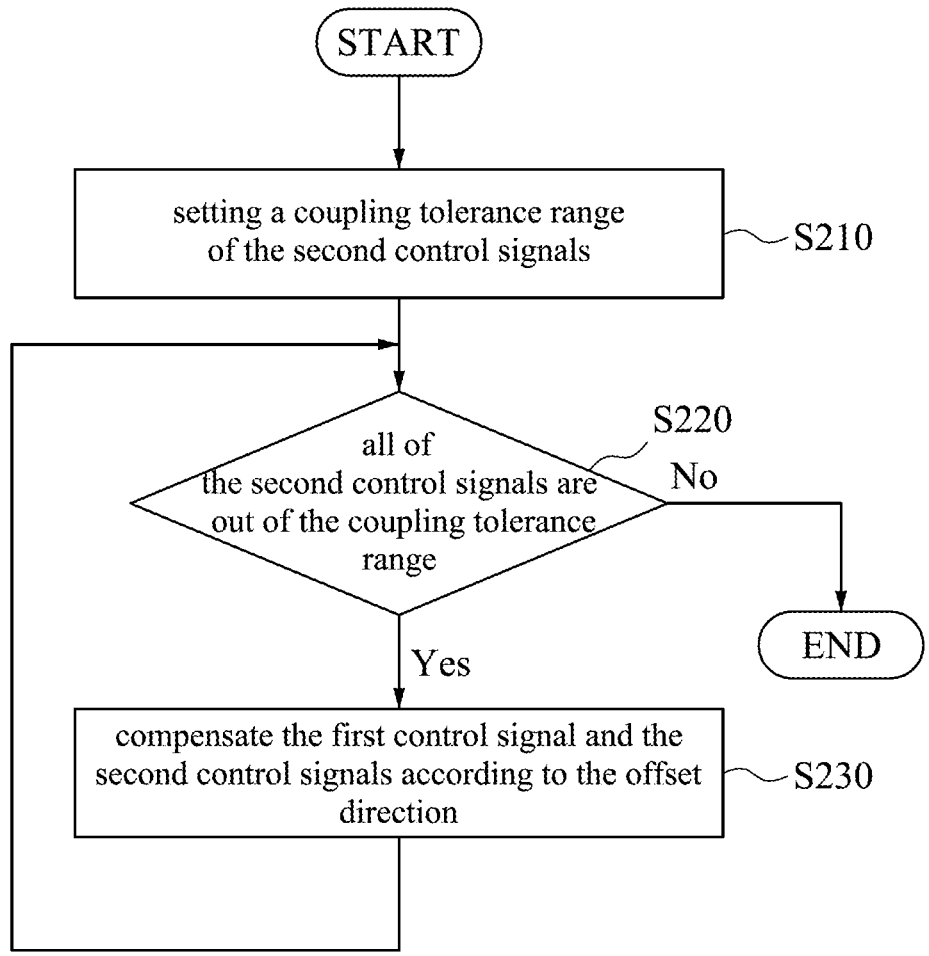
FIG. 14 is a flowchart illustrating a decoupling method, in accordance with some other embodiments of the present disclosure.

In some other embodiments, for coupling of the voltage equalization control loop to the total output signal control loop, the controller CON will detect the second control signals CS2_1~CS2_n outputted by the voltage equalization control loop. When the controller CON determines that the bias generated by coupling is too high, the voltage equalization control loop and the total output signal control loop will be corrected to implement decoupling. Reference is now made to FIG. 14. FIG. 14 is a flowchart illustrating a decoupling method 200, in accordance with some other embodiments of the present disclosure. As shown in FIG. 14, the decoupling method includes operations S210, S220 and S230.

First, in the operation S210, a coupling tolerance range of the second control signals CS2_1~CS2_n is set. In detail, an upper limit and a lower limit of the coupling tolerance is preset by the controller CON according to the second control signals CS2_1~CS2_n.

Next, in the operation S220, whether all of the second control signals are out of the coupling tolerance range is determined. In detail, the controller keep detecting the second control signals CS2_1~CS2_n, and determine whether all of the second control signals are higher than the upper limit of the coupling tolerance range or lower than the lower limit of the coupling tolerance range.

When all of the second control signals CS2_1~CS2_n are out of the coupling tolerance range, the first control signal CS1 and the second control signals CS2_1~CS2_n are compensated according to the offset direction, in the operation S230. In detail, when all of the second control signals CS2_1~CS2_n are higher than the upper limit of the coupling tolerance range, a default compensation value is subtracted from the second control signals CS2_1~CS2_n by the controller CON, and the default compensation value is added to the first control signal CS1 accordingly. On the other hand, when all of the second control signals CS2_1~CS2_n are lower than the lower limit of the coupling tolerance range, the default compensation value is added to the second control signals CS2_1~CS2_n by the controller CON, and the default compensation value is subtracted by the first control signal CS1 accordingly. In other words, the compensation direction of the second control signals CS2_1~CS2_n and the first control signal CS1 are opposite.

After compensating the first control signal CS1 or the second control signals CS2_1~CS2_n, the operation S220 is performed. If all of the second control signals CS2_1~CS2_n are still out of the coupling tolerance range, compensating operation will keep being performed. The operation of compensating will stop when at least one of the second control signals CS2_1~CS2_n is within the coupling tolerance range. In this way, by monitoring the second control signals CS2_1~CS2_n and performing compensation opposite to the offset direction in decoupling method 200, the problem of coupling and bias can be avoided.

In some embodiments, the coupling tolerance range (i.e. the upper limit of the coupling tolerance range and the lower limit of the coupling tolerance range) and the compensation value mentioned above are set to default value(s), which can be designed and modified according to the actual working conditions (e.g., load size) of the DC-DC conversion system 100. For example, when loading become larger, the tolerance range is wider and the compensation value is higher; when loading become smaller, the tolerance range is narrower and the compensation value is lower.

To be noticed, the total output signal control loop mentioned above can include the control loop of total output voltage, total output current or total output power. In addition, the second control signal and its' coupling tolerance range can be switching frequency, counter value, duty cycle value or other detecting value. In other embodiments, the second control signal and its' coupling tolerance range, which are detected, can be different types of value in the aforementioned types, and the conditions can be determined and be compensated accordingly based on their relationship after conversion.

Figure 6:
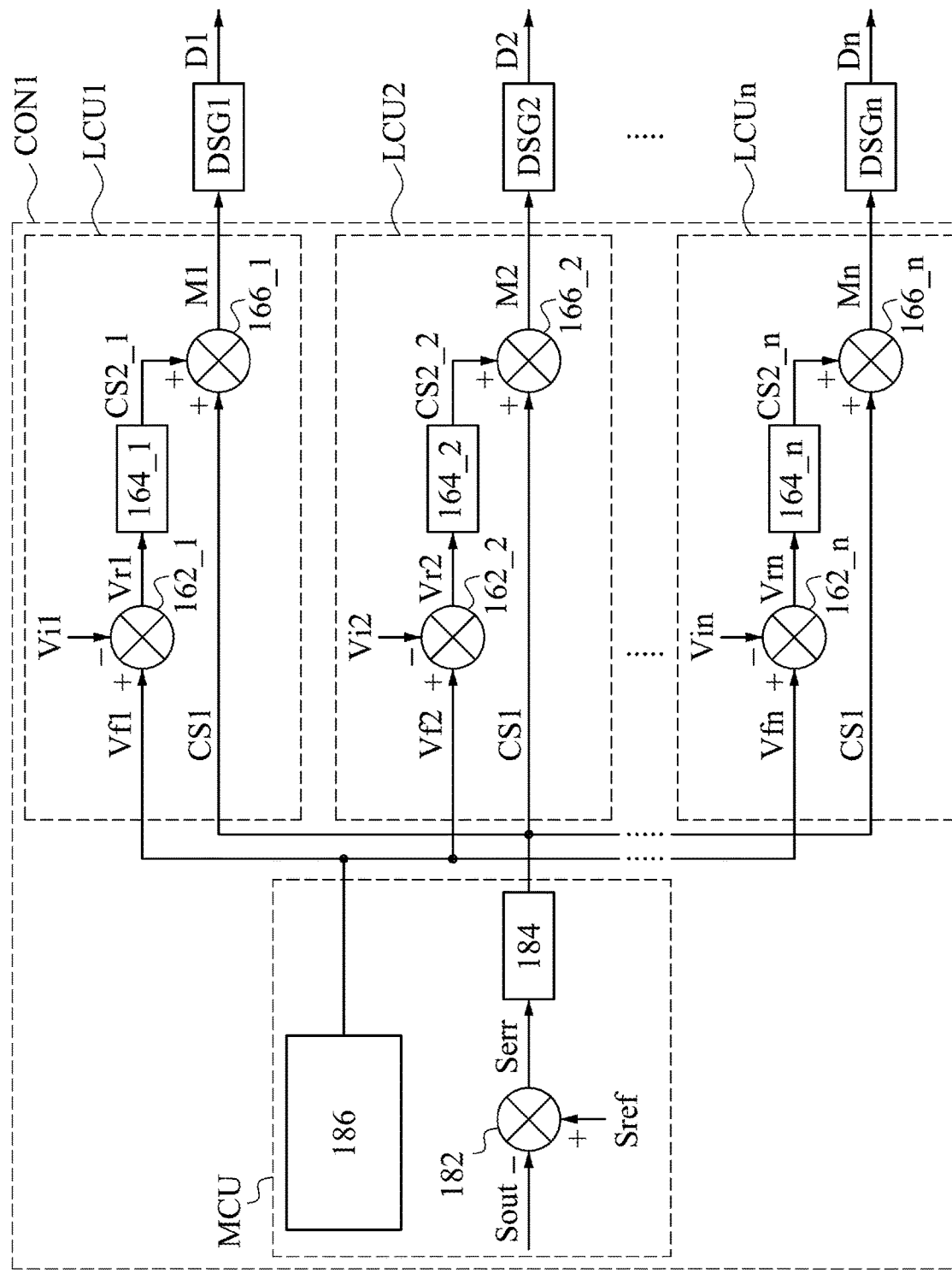
FIG. 6 is a schematic diagram illustrating a main controller and a number of local controllers, in accordance with some embodiments of the present disclosure.

Reference is now made to FIG. 6. FIG. 6 is a schematic diagram illustrating a main controller MCU and a number of local controllers LCU1~LCUn, in accordance with some embodiments of the present disclosure. Specifically, FIG. 6 is the schematic diagram illustrating the controller CON1 including the main controller MCU and the local controllers LCU1~LCUn in FIG. 3. In embodiments of FIG. 6, components similar to those in the embodiments of FIG. 5 are represented by the same component symbols. In this embodiment, the main controller MCU includes the error unit 182, the voltage stabilization control unit 184, and the input reference voltage signal generator 186. The main controller MCU is configured to subtract the output signal Sout from the output reference signal Sref to obtain output error value Serr, and the voltage stabilization control unit 184 receives the output error value Serr and generates the first control signal CS1. The input reference voltage signal generator 186 in the main controller MCU generates the corresponding input reference voltage signal of the input reference voltage signals Vf1~Vfn according to the input voltage signals Vi1~Vin. Each of the local controller LCU1~LCUn includes the corresponding error unit of the error units 162_1~162_n, the corresponding voltage stabilization control unit of the voltage stabilization control units 164_1~164_n, and the corresponding adding unit of the adding units 166_1~166_n (e.g., the local controller LCU1 includes the error unit 162_1, the voltage stabilization control unit 164_1, and the adding unit 166_1). Detail operations of the components described in the previous paragraphs will be omitted for the sake of brevity.

Figure 7:
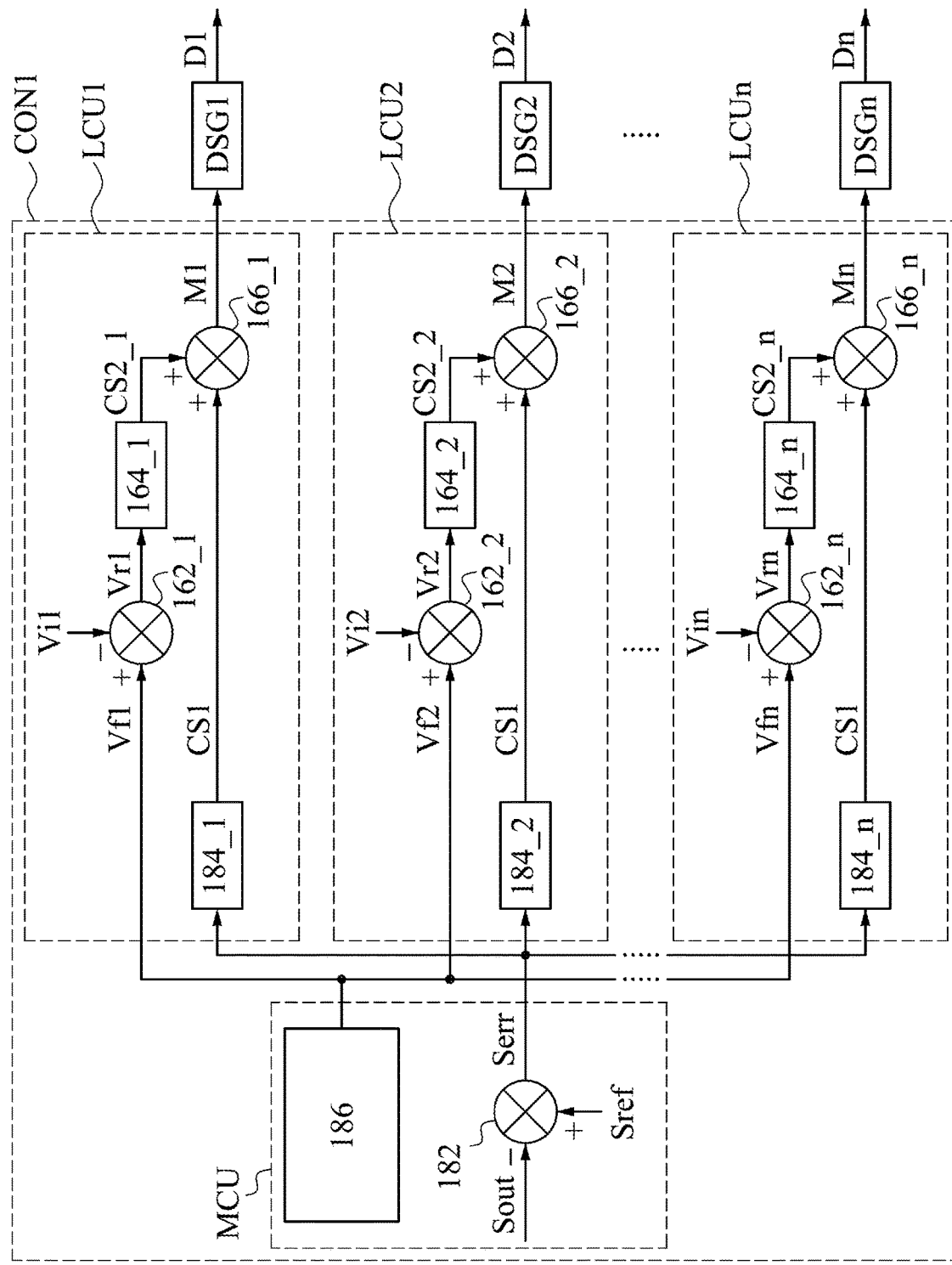
FIG. 7 is a schematic diagram illustrating another main controller and a number of local controllers, in accordance with some embodiments of the present disclosure.

Reference is now made to FIG. 7. FIG. 7 is a schematic diagram illustrating another main controller MCU and a number of local controllers LCU1~LCUn, in accordance with some embodiments of the present disclosure. Specifically, FIG. 7 is the schematic diagram illustrating the controller CON1 including the main controller MCU and the local controllers LCU1~LCUn in FIG. 3. In embodiments of FIG. 7, component similar to those in the embodiments of FIG. 5 are represented by the same component symbols. In this embodiment, the main controller MCU includes the error unit 182 and the input reference voltage signal generator 186. The main controller MCU is configured to subtract the output signal Sout from the output reference signal Sref to obtain the output error value Serr. The input reference voltage signal generator 186 in the main controller MCU generates the corresponding input reference voltage signal of the input reference voltage signals Vf1~Vfn according to the input voltage signal Vi1~Vin. Each of the local controllers LCU1~LCUn includes the corresponding voltage stabilization control unit of the voltage stabilization control units 184_1~184_n, the corresponding error unit of the error units 162_1~162_n, the corresponding voltage stabilization control unit of the voltage stabilization control units 164_1~164_n, and the corresponding adding unit of the adding units 166_1~166_n (e.g., the local controller LCU1 includes the voltage stabilization control unit 184_1, the error unit 162_1, the voltage stabilization control unit 164_1, and the adding unit 166_1).

In further, the error unit 182 in the main controller MCU outputs the output error value Serr got by subtracting the output signal Sout from the output reference signal Sref, to each of the local controllers LCU1~LCUn. Each of the voltage stabilization control units 184_1~184_n in each of the local controllers LCU1~LCUn respectively, receives the output error value Serr, and generates the first control signal CS1 according to the output error value Serr respectively. Detail operations of other components described in the previous paragraphs will be omitted for the sake of brevity.

Figure 8:
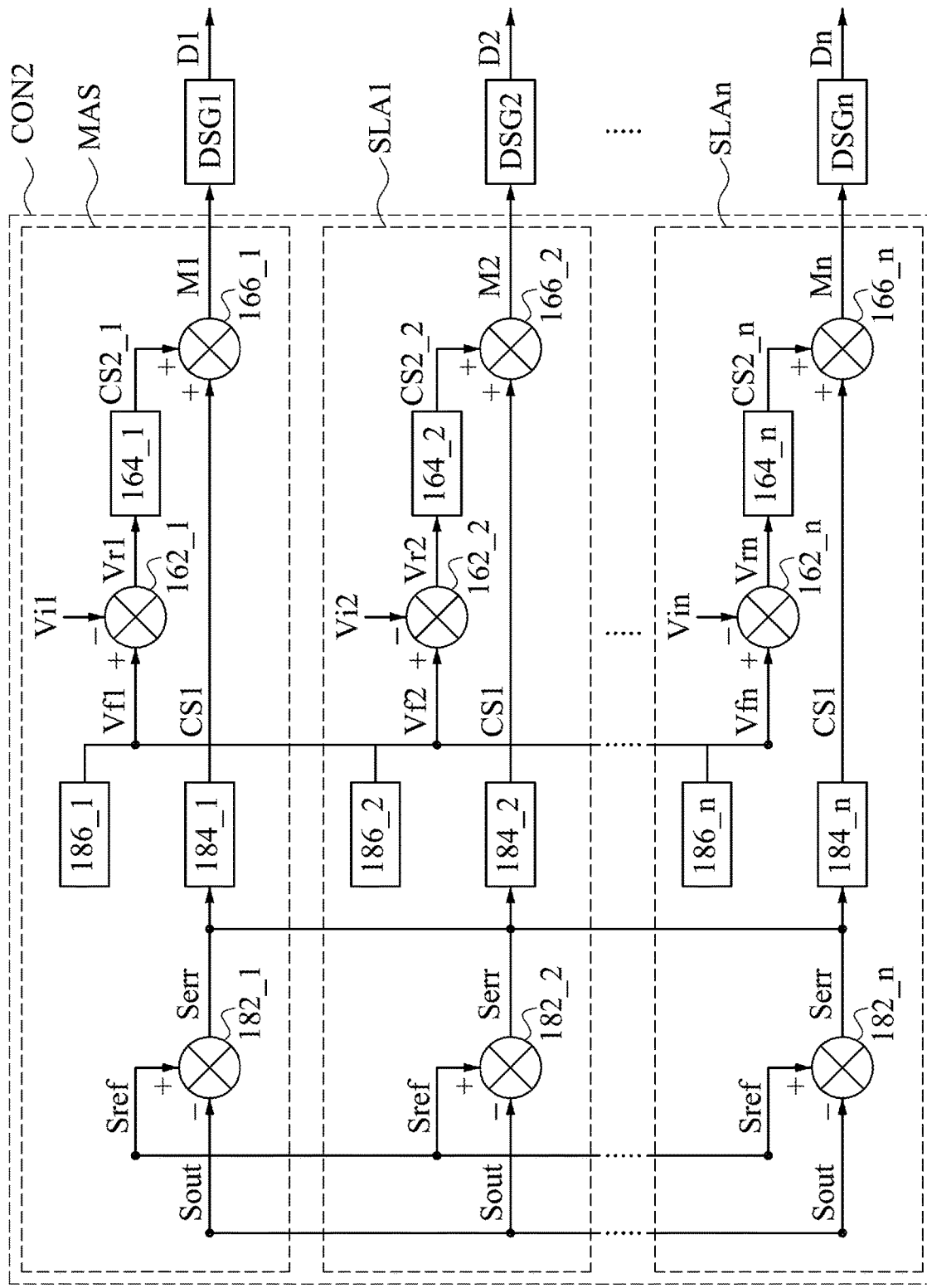
FIG. 8 is a schematic diagram illustrating a number of local controllers, in accordance with some other embodiments of the present disclosure.

Reference is now made to FIG. 8. FIG. 8 is a schematic diagram illustrating a number of local controllers MAS and SLA1~SLAn. Specifically, FIG. 8 is the schematic diagram illustrating the controller CON2 including a number of local controllers MAS and SLA1~SLAn in FIG. 4. In embodiments of FIG. 8, component similar to those in the embodiments of FIG. 5 are represented by the same component symbols. Since that one of the local controllers is the main-controller as the master operationally, other local controller are controlled by the master, as slaves, in this embodiments, each of the local controllers MAS and SLA1~SLAn includes an error unit 182, a voltage stabilization control unit 184, and an input reference voltage signal generator 186.

Operationally, for example, the error units 182_1~182_n of each of the local controllers MAS and SLA1~SLAn may receive and use the same output signal Sout and/or the same output reference signal Sref. The voltage stabilization control units 184_1~184_n of each of the local controllers MAS and SLA1~SLAn may receive the output error value Serr outputted by the corresponding error unit of the error units 182_1~182_n, or may receive and use the same output error value Serr from one of the error units 182_1~182_n by each of the voltage stabilization control units 184_1~184_n. The input reference voltage signal generators 186_1~186_n of each of the local controllers MAS and SLA1~SLAn may generates the corresponding input reference voltage signal of the input reference voltage signals Vf1~Vfn respectively, or the input reference voltage signals Vf1~Vfn may be generated by one of the input reference voltage signal generators 186_1~186_n and be transmitted to other local controllers. Please refer to different embodiments of FIG. 9, FIG. 10 and FIG. 11 for further explanation. For simplicity of illustration, in embodiments of FIG. 9, FIG. 10 and FIG. 11, only functional blocks in use in each local controller are illustrated, unused components without illustration do not mean that the local controller do not have the function or the component.

Figure 9:
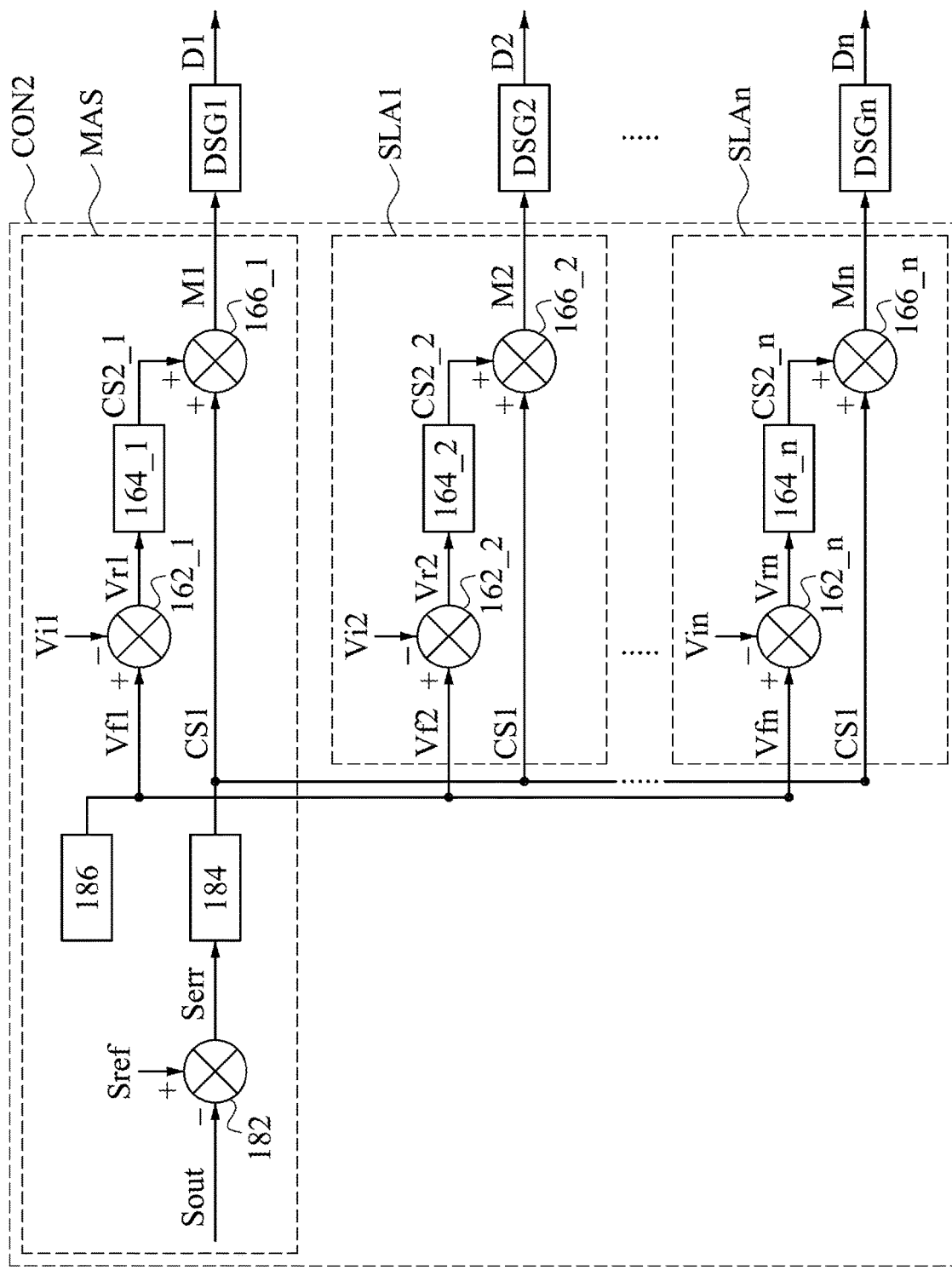
FIG. 9 is a schematic diagram illustrating a number of local controllers, in accordance with some other embodiments of the present disclosure.

Reference is now made to FIG. 9. FIG. 9 is a schematic diagram illustrating a number of local controllers MAS and SLA1~SLAn, in accordance with some other embodiments of the present disclosure. In embodiments of FIG. 9, component similar to those in the embodiments of FIG. 8 are represented by the same component symbols. In this embodiments, the input reference voltage signal generator 186, in the local controller MAS, which is the master, generates the corresponding input reference voltage signal of the input reference voltage signals Vf1~Vfn according to the input voltage signals Vi1~Vin. The local controller MAS as the master receives and generates the first control signal CS1 according to the output signal and the output reference signal. Each local controller is configured to perform voltage-equalization according to the corresponding input voltage signal of the input voltage signals Vi1~Vin and the corresponding input reference voltage signal of the input reference voltage signals Vf1~Vfn, to generate the corresponding second control signal CS2. Detail operations of other components similar to embodiments of FIG. 6 have been described in the previous paragraphs, and will be omitted for the sake of brevity.

Figure 10:
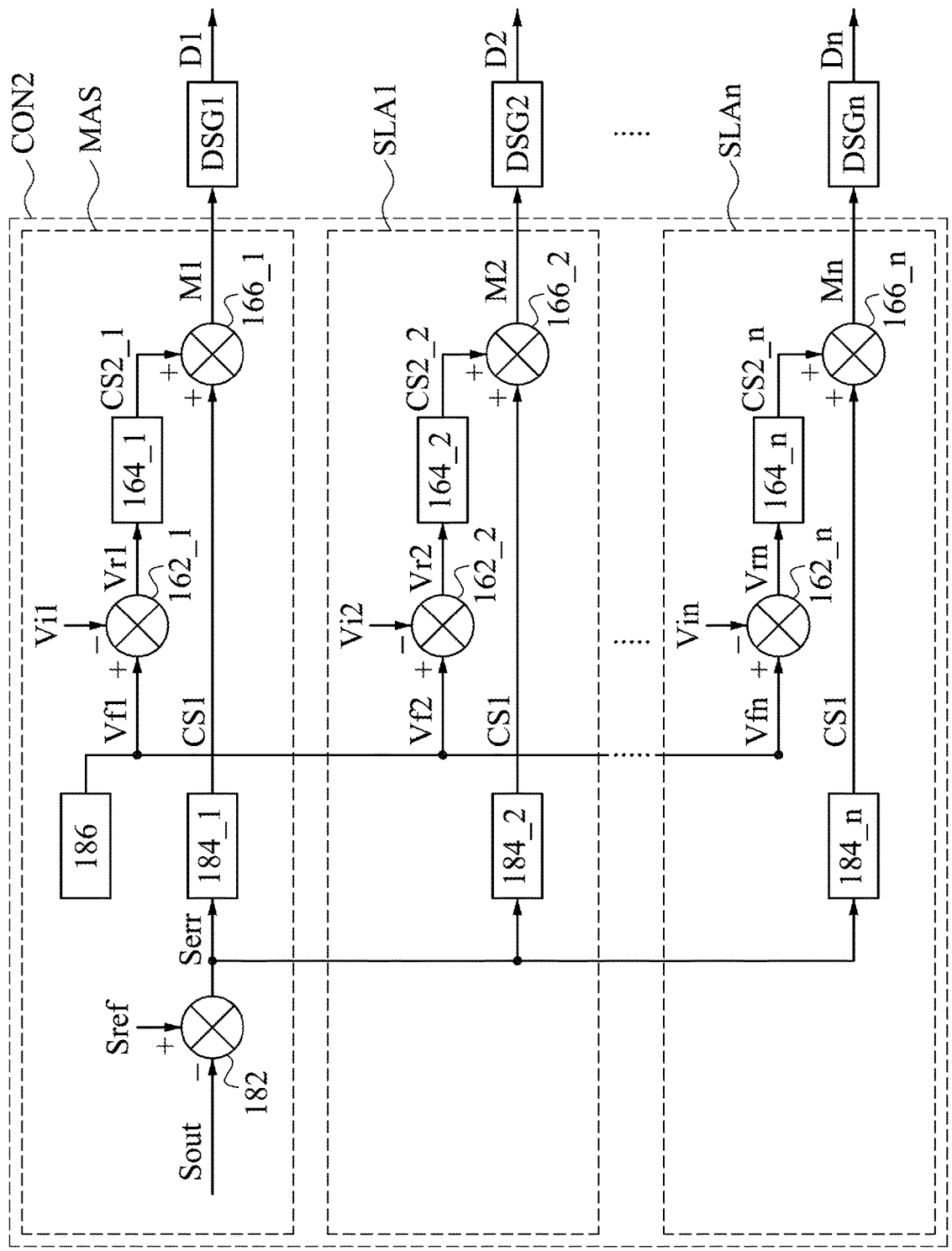
FIG. 10 is a schematic diagram illustrating a number of other local controllers, in accordance with some other embodiments of the present disclosure.

Reference is now made to FIG. 10. FIG. 10 is a schematic diagram illustrating a number of other local controllers MAS and SLA1~SLAn, in accordance with some other embodiments of the present disclosure. In embodiments of FIG. 10, component similar to those in the embodiments of FIG. 8 are represented by the same component symbols. In this embodiments, the input reference voltage signal generator 186 in the local controller MAS which as the master generates the corresponding input reference voltage signal of the input reference voltage signals Vf1~Vfn according to the input voltage signal Vi1~Vin. The error unit 182 in the local controller MAS which as the master, receives the output signal Sout and generates the output error value Serr according to the output signal Sout and the output reference signal Sref. The voltage stabilization control units 184_1~184_n in each local controller receive the output error value Serr and generate the first control signal CS1 according to the output error value Serr. Detail operations of other components similar to embodiments of FIG. 7 have been described in the previous paragraphs, and will be omitted for the sake of brevity.

Figure 11:
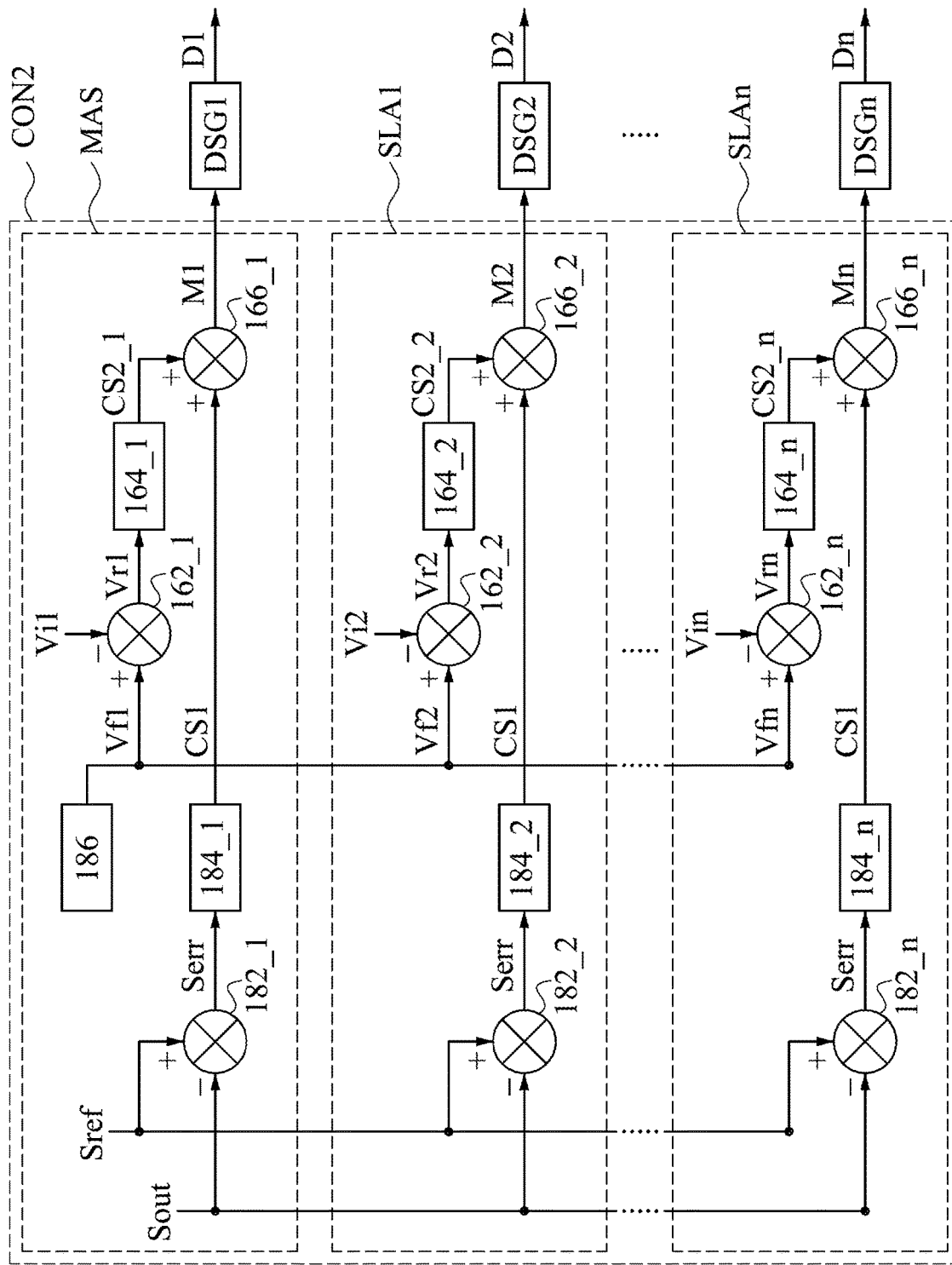
FIG. 11 is a schematic diagram illustrating a number of other local controllers, in accordance with some other embodiments of the present disclosure.

Reference is now made to FIG. 11. FIG. 11 is a schematic diagram illustrating a number of other local controllers MAS and SLA1~SLAn, in accordance with some other embodiments of the present disclosure. In embodiments of FIG. 11, component similar to those in the embodiments of FIG. 8 are represented by the same component symbols. In this embodiments, the input reference voltage signal generator 186 in the local controller MAS which as the master, generates the corresponding input reference voltage signal of the input reference voltage signals Vf1~Vfn according to the input voltage signals Vi1~Vin, and outputs the input reference voltage signals Vf1~Vfn to the corresponding local controller of the local controllers MAS and SLA1~SLAn. The local controller MAS which as the master outputs the output signal Sout received from the output sensor 120 to other local controllers SLA1~SLAn, which as the slaves. The error units 182_1~182_n in all of the local controller MAS and SLA1~SLAn subtracts the output signal Sout from the output reference signal Sref to get the output error value Serr respectively. Afterwards, each of the voltage stabilization control units 184_1~184_n in the local controllers MAS and SLA1~SLAn generates the first control signal CS1 respectively according to the output error value Serr. Detail operations of other components described in the previous paragraphs will be omitted for the sake of brevity.

To be noticed, the input reference voltage signals Vf1~Vfn in FIG. 5 to FIG. 11 can have exactly the same voltage value, and may also have voltage values not exactly the same. For example, when there is a midpoint with voltage level at zero, on the first side of the conversion modules MOD1~MODn which connected in series, and the amount of the power conversion modules between the midpoint and the positive voltage are different from the power conversion modules between the midpoint and the negative voltage, by setting different input reference voltage signals Vf1~Vfn, the same voltage difference can be ensured between the negative voltage and the midpoint and between the positive voltage and the midpoint. For example, if the positive voltage is +120V, the negative voltage is −120V, and there are three power conversion modules MOD1~MOD3 between the positive voltage and the midpoint and there are four power conversion modules MOD4~MOD7 between the negative voltage and the midpoint, by setting the input reference voltage signals Vf1~Vf3 to 40V and setting the input reference voltage signals Vf4~Vf7 to 30V, the same voltage difference can be ensured between the negative voltage and the midpoint and between the positive voltage and the midpoint.

Figure 12B:
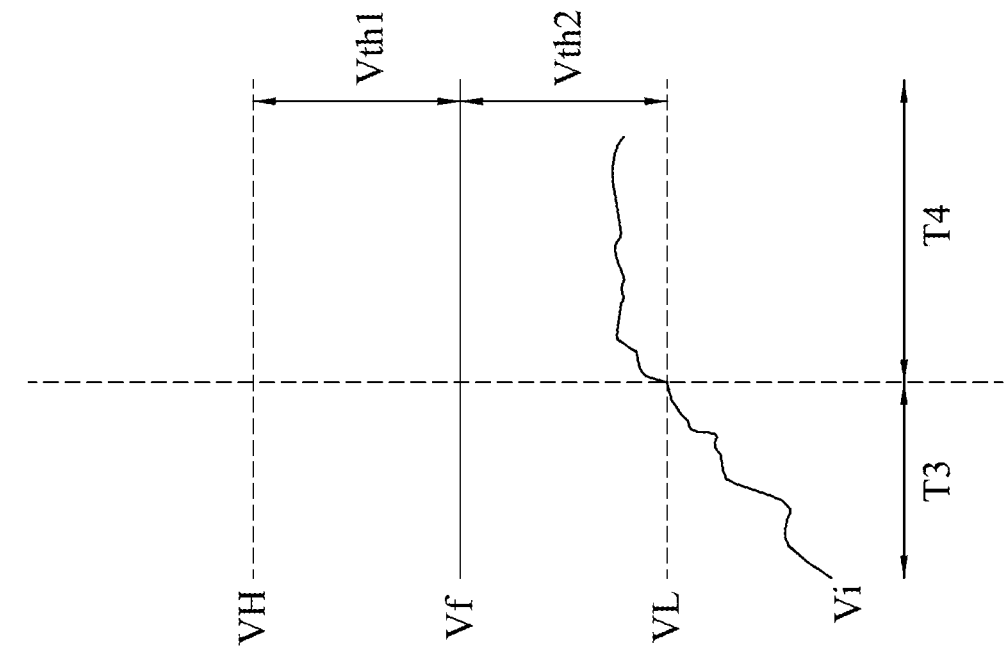
FIG. 12A and FIG. 12B are schematic diagrams illustrating a voltage-equalized signal, in accordance with some embodiments of the present disclosure.
Figure 12A:
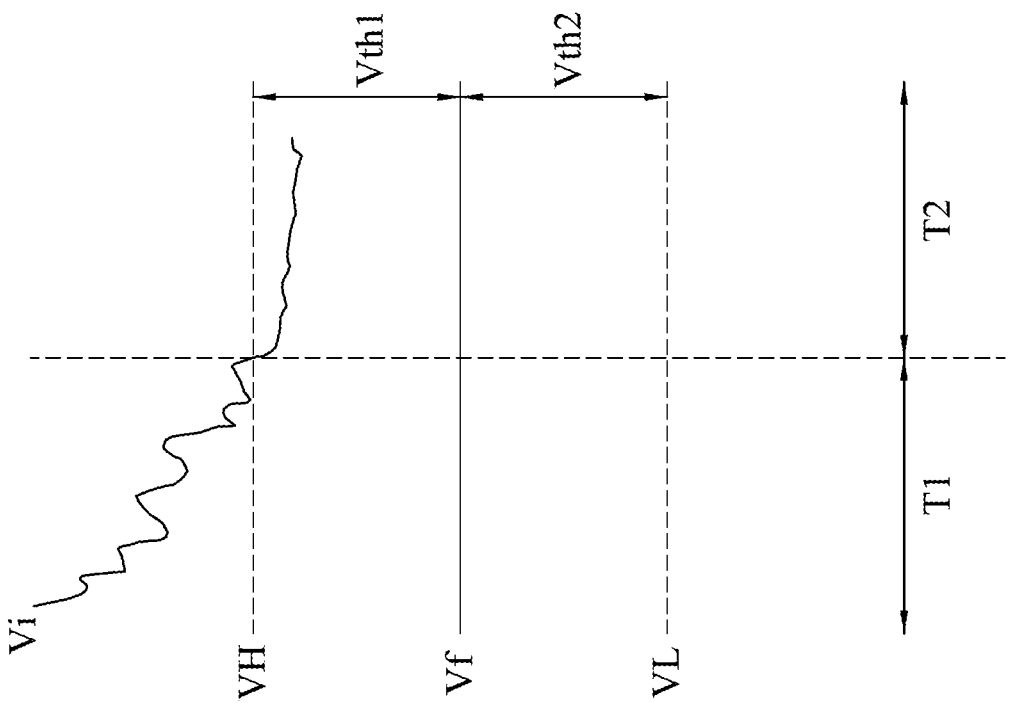

Additionally, please refer to FIG. 12A and FIG. 12B for detail operations related to voltage-equalization. FIG. 12A and FIG. 12B are schematic diagrams illustrating a voltage-equalized signal, in accordance with some embodiments of the present disclosure. As shown in FIG. 12A and FIG. 12B, when the input voltage signal Vi is higher than a threshold voltage Vth1 (as shown in period T1, the input voltage signal Vi is higher than a setting voltage VH), or the input voltage signal Vi is lower than the threshold voltage Vth2 (as shown in period T3, the input voltage signal Vi is lower than a setting voltage VL), the controller CON will perform voltage-equalization to modify the corresponding second control signal CS2.

On the contrary, as shown in FIG. 12A and FIG. 12B, when the input voltage signal Vi is not higher than the threshold voltage Vth1 (as shown in period T2, the input voltage signal Vi is lower than the setting voltage VH), and the input voltage signal Vi is not lower than the threshold voltage Vth2 (as shown in period T4, the input voltage signal Vi is higher than the setting voltage VL), the controller CON will maintain the corresponding second control signal CS2.

In some embodiments, the difference between the setting voltage VH and the reference voltage Vf is the same as the difference between the setting voltage VL and the reference voltage Vf. In other words, the threshold voltage Vth1 and the threshold voltage Vth2 are the same. In some other embodiments, the difference between the setting voltage VH and the reference voltage Vf are different from the difference between the setting voltage VL and the reference voltage Vf. In other words, the threshold voltage Vth1 is different from the threshold voltage Vth2.

In addition, in some embodiments, the local controllers LCU1~LCUn (or the local controllers SLA1~SLAn) receive the input voltage signals Vi1~Vin synchronously according to a clock label of the main controller MCU (or the local controller MAS as the master). Specifically, synchronous flag can be generated in every period or every multiple periods. Accordingly, based on the clock of the main controller, synchronization of the local controllers LCU1~LCUn (or the local controllers SLA1~SLAn) can be implemented, to ensure that the local controllers LCU1~LCUn (or the local controllers SLA1~SLAn) transmit the input voltage at the same moment, which makes the voltage-equalization more precise.

Figure 13A:
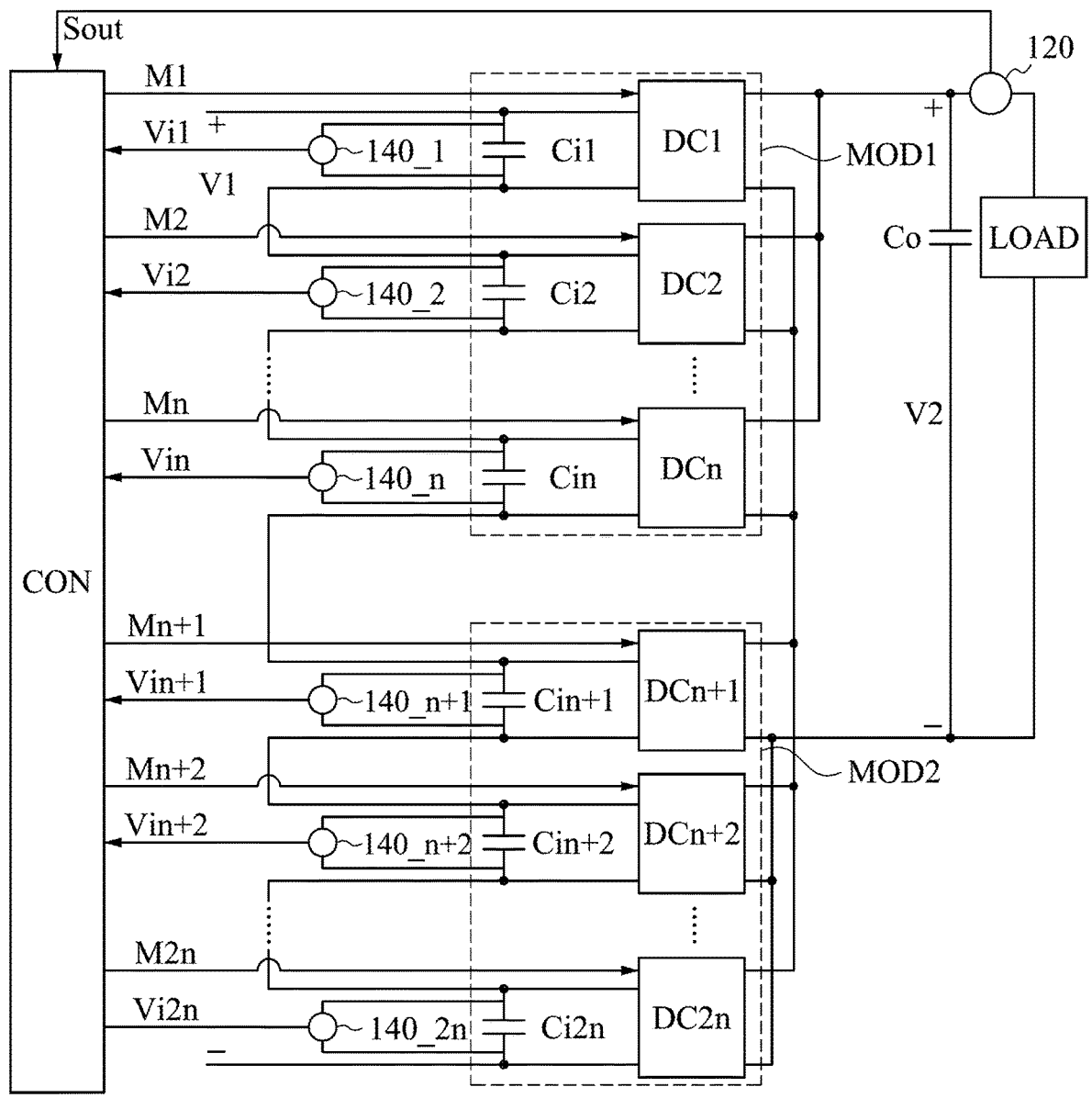
FIG. 13A and FIG. 13B are schematic diagrams illustrating another DC-DC conversion system, in accordance with some other embodiments of the present disclosure.
Figure 13B:
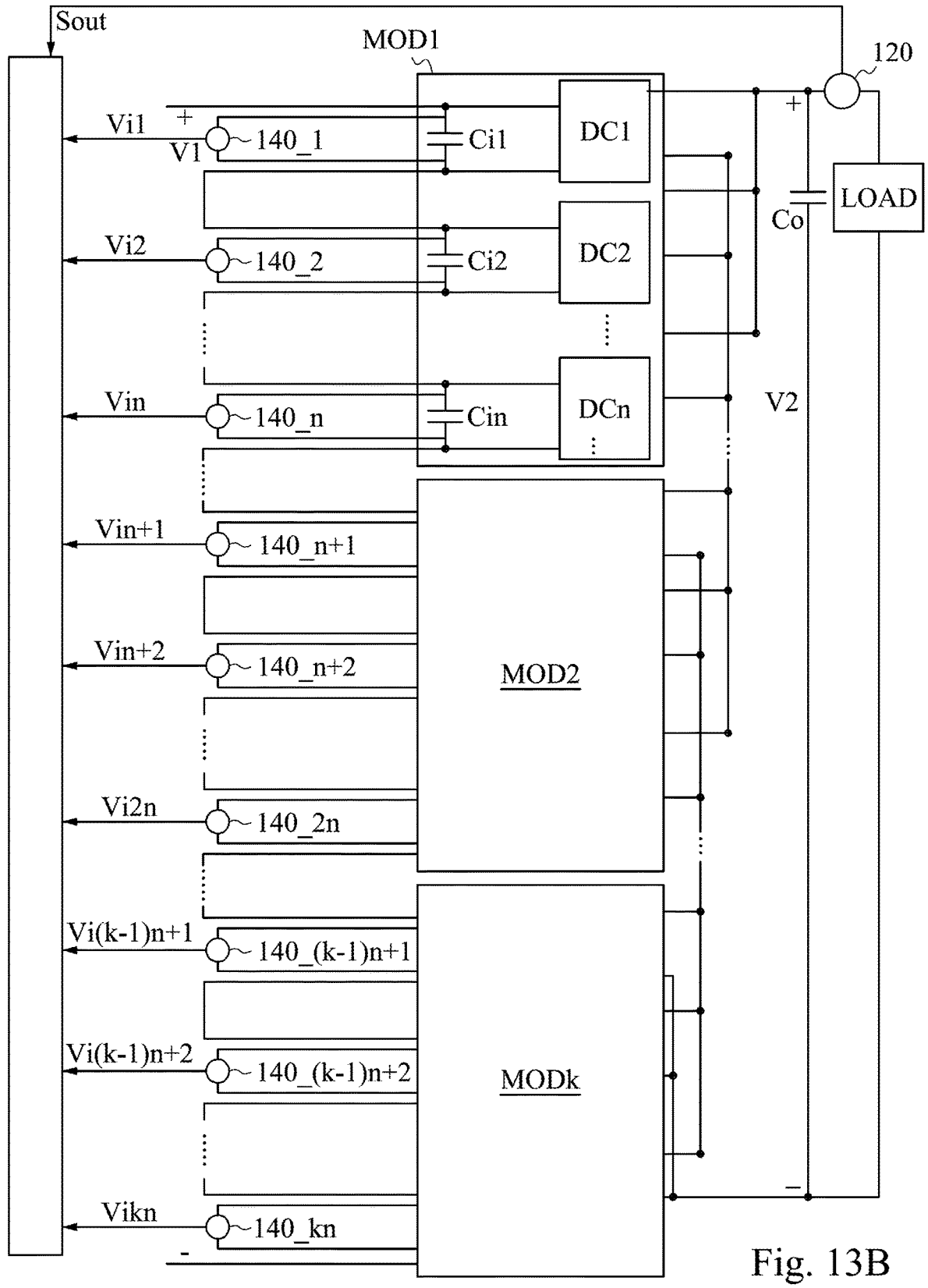

Reference is now made to FIG. 13A and FIG. 13B. FIG. 13A and FIG. 13B are schematic diagrams illustrating another DC-DC conversion system 100, in accordance with some other embodiments of the present disclosure. In embodiments of FIG. 13A and FIG. 13B, same component symbols are used to refer to similar components in the embodiments of FIG. 1. Compare to embodiments of FIG. 1, in embodiments of FIG. 13A, the DC-DC conversion system 100 includes a number of power conversion modules MOD1 and MOD2. Each of the power conversion module MOD1 and MOD2 includes a number of conversion units $DC_1$~$DC_n$ and $DC_{n+1}$~$DC_{2n}$. Each of the conversion units $DC_1$~$DC_n$ and $DC_{n+1}$~$DC_{2n}$ includes a first side and a second side.

Structurally, the first side of the power conversion modules MOD1 and MOD2 are connected to each other in series. The second side of the power conversion modules MOD1 and MOD2 are connected to each other in series as well. In other words, on the first side of the DC-DC conversion system 100, the conversion units $DC_1$~$DC_n$ and $DC_{n+1}$~$DC_{2n}$ are connected in series. On the second side of the DC-DC conversion system 100, the conversion units $DC_1$~$DC_n$ are connected in parallel and $DC_{n+1}$~$DC_{2n}$ are connected in parallel respectively, and the conversion units $DC_1$~$DC_n$ are connected to the conversion units $DC_{n+1}$~$DC_{2n}$ in series.

Additionally, in embodiments of FIG. 13B, the DC-DC conversion system 100 includes a number (k) of power conversion modules MOD1~MODk. In which, k is a positive integer not less than 1. Each of the power conversion modules MOD1~MODk includes at least one conversion unit (for simplicity of illustration, only the conversion units $DC_1$~$DC_n$ in the power conversion module MOD1 are illustrated.). Structurally, similar to FIG. 13A, the first side of the power conversion modules MOD1~MODk are connected to each other in series, and the second side of the power conversion modules MOD1~MODk are connected to each other as well. Detail operations of other components described in the previous paragraphs will be omitted for the sake of brevity.

To be noticed, the amount of the conversion units included in each power conversion module can be the same or not exactly the same. Though there are only n power conversion units on the second side connected in parallel illustrated in the figure for simplicity of illustration, the present disclosure are not limited thereto.

Although the present disclosure illustrates the method as steps or events in series, it should be understood that the orders of the steps or the events should not be limited thereto. For example, some steps can occur in different orders and/or occur with other steps or events not illustrates in the present disclosure. Also, when implementing one or more embodiments disclosed in the present disclosure, not all of the steps are necessary. In addition, one or more steps can be performed in one or more separated steps or phrases.

To be noticed, in the situation without conflict, each if the figures, embodiments and its' features and circuits can be combined with each other. Circuits in the figures are used as examples to simplify the illustration and for ease of understanding, which are not limited thereto. In addition, the devices, units, and components in aforementioned embodiments can be implemented by various types of digital or analog circuit, and can also be implemented by different integrated circuit or be integrated into a single chip. Descriptions above are only exemplary examples, the present disclosure is not limited thereto.

In sum, by applying various embodiments mentioned above, the present disclosure can generate feedback signal, according to the input voltage signals Vi1~Vin and output signal Sout transmitted by each of the power conversion modules MOD1~MODn, by calculating and performing voltage-equalization, etc., by the controller CON, to equalize the input voltage of each of the power conversion modules MOD1~MODn, to lower the voltage stress of the transistors. Instead of adding a voltage-equalization circuit by hardware, solving the problem of voltage disequilibrium by a control method can lower the cost.

Additionally, the extensibility of the present disclosure is better, in which the amount of the power conversion modules can be modified according to actual application. In some embodiments, only voltage signals are sampled, and can perform voltage-equalization with less control amount, in which the easy system design can be applied to medium and high voltage. In some other embodiments, control interconnects between the power conversion modules can be avoided, and the possibility of interfered signals or circuits can be lower. Decentralized control method of the system can improve reliability and redundancy of the system.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided fall within the scope of the following claims.

What is claimed is:

1. A DC-DC conversion system comprising:
   a plurality of power conversion modules, each of the plurality of power conversion modules comprising at least one conversion unit, each of the conversion units comprising a first side and a second side, wherein the first sides of the conversion units are connected in series, and the second sides of the conversion units are connected in parallel;
   an output sensor configured to detect an output signal of the DC-DC conversion system;
   a plurality of input sensors configured to detect a plurality of input voltage signals of the first sides of the conversion units, respectively; and
   a controller coupled to the conversion units, the plurality of input sensors, and the output sensor, wherein the controller is configured to output a modulation signal to control a plurality of switches of one of the conversion units corresponding to the modulation signal according to a first control signal and one of a plurality of second control signals corresponding to the modulation signal;
   wherein the first control signal is associated with the output signal and an output reference signal, and the plurality of second control signals are associated with the plurality of input voltage signals and a plurality of input reference voltage signals.

2. The DC-DC conversion system of claim 1, wherein the output signal is an output current signal, an output voltage signal or an output power signal.

3. The DC-DC conversion system of claim 1, wherein voltage values of the plurality of input reference voltage signals are different from each other.

4. The DC-DC conversion system of claim 1, wherein the controller comprises a main controller and a plurality of local controllers,
   the main controller is coupled to the output sensor and the plurality of local controllers, and is configured to receive the output signal and generate the first control signal according to the output signal and the output reference signal, and is configured to receive the plurality of input voltage signals and generate the plurality of input reference voltage signals according to the plurality of input voltage signals, each of the plurality of local controllers is coupled to a corresponding power conversion module of the plurality of power conversion modules, the main controller and a corresponding input sensor of the plurality of input sensors, wherein each of the plurality of local controllers is configured to receive the first control signal and generate a corresponding second control signal of the plurality of second control signals by performing voltage-equalization on a basis of a corresponding input voltage signal of the plurality of input voltage signals and a corresponding input reference voltage signal of the plurality of input reference voltage signals, and is configured to output the modulation signal.

5. The DC-DC conversion system of claim 4, wherein the main controller comprises an error unit and a voltage stabilization control unit, the error unit is configured to receive the output signal and subtract the output signal from the output reference signal to get an output error value, the voltage stabilization control unit is configured to receive the output error value and generate the first control signal according to the output error value.

6. The DC-DC conversion system of claim 1, wherein the controller comprises a main controller and a plurality of local controllers, the main controller is coupled to the output sensor and the plurality of local controllers is configured to receive the output signal and generate an output error value according to the output signal and the output reference signal, and is configured to receive the plurality of input voltage signals and generate the plurality of input reference voltage signals according to the plurality of input voltage signals, each of the plurality of local controllers is coupled to a corresponding power conversion module of the plurality of power conversion modules, the main controller and a corresponding input sensor of the plurality of input sensors, wherein each of the plurality of local controllers is configured to receive the output error value and generate the first control signal according to the output error value, and is configured to generate a corresponding second control signal of the plurality of second control signals by performing voltage-equalization on a basis of a corresponding input voltage signal of the plurality of input voltage signals and a corresponding input reference voltage signal of the plurality of input reference voltage signals, and output the modulation signal according to the first control signal and the corresponding second control signal.

7. The DC-DC conversion system of claim 1, wherein the controller comprises a plurality of local controllers, each of the plurality of local controllers is coupled to a corresponding power conversion module of the plurality of power conversion modules, a corresponding input sensor of the plurality of input sensors corresponding to the corresponding power conversion module, and the output sensor, and is configured to receive the output signal and a corresponding input voltage signal of the plurality of input voltage signals, wherein one of the plurality of local controllers is further configured to receive the plurality of input voltage signals outputted by other local controllers of the plurality of local controllers, and is configured to generate the plurality of input reference voltage signals according to the plurality of input voltage signals, and is configured to generate the first control signal according to the output signal and the output reference signal, wherein each of the plurality of local controllers is configured to perform voltage-equalization according to the corresponding input voltage signal and a corresponding input reference voltage signal of the plurality of input reference voltage signals, to generate a corresponding second control signal of the plurality of second control signals, and output the modulation signal.

8. The DC-DC conversion system of claim 1, wherein the controller comprises a plurality of local controller, each of the plurality of local controllers is coupled to a corresponding power conversion module of the plurality of power conversion modules, a corresponding input sensor of the plurality of input sensors corresponding to the corresponding power conversion module, and the output sensor, and is configured to receive the output signal and a corresponding input voltage signal of the plurality of input voltage signals, wherein one of the plurality of local controllers is further configured to receive the plurality of input voltage signals outputted by other local controllers of the plurality of local controllers, and is configured to generate the plurality of input reference voltage signals according to the plurality of input voltage signals, and is configured to generate an output error value according to the output signal and the output reference signal, wherein each of the plurality of local controllers is configured to generate the first control signal according to the output error value, and generate a corresponding second control signal of the plurality of second control signals by performing voltage-equalization according to the corresponding input voltage signal and a corresponding input reference voltage signal of the plurality of input reference voltage signals, and is configured to output the modulation signal.

9. The DC-DC conversion system of claim 1, wherein the controller comprises a plurality of local controller, each of the plurality of local controllers is coupled to a corresponding power conversion module of the plurality of power conversion modules, one of the plurality of input sensors corresponding to the corresponding power conversion module, and the output sensor, and each of the plurality of local controllers is configured to receive the output signal and a corresponding input voltage signal of the plurality of input voltage signals, each of the plurality of local controllers comprises an error unit and a voltage stabilization control unit, each of the error units is configured to receive the output signal, subtract the output signal from the output reference signal to get an output error value, and output the output error value to the voltage stabilization control unit corresponding to the error unit, each of a plurality of voltage stabilization control units receives the output error value and generates the first control signal according to the output error value;

wherein one of the plurality of local controllers is further configured to receive the plurality of input voltage signals outputted by other local controllers of the plurality of local controllers, and is configured to generate the plurality of input reference voltage signals according to the plurality of input voltage signals, wherein each of the plurality of local controllers is configured to generate a corresponding second control signal of the plurality of second control signals by performing voltage-equalization according to the corresponding input voltage signal and a corresponding input reference voltage signal of the plurality of input reference voltage signals, and output the modulation signal.

10. The DC-DC conversion system of claim 1, wherein at least one conversion unit comprises a DC conversion module, and the DC conversion module comprises a full bridge inverter circuit, a resonant circuit, a transformer and a rectifier circuit, wherein the resonant circuit is coupled between an AC side of the full bridge inverter circuit and a primary winding of the transformer, and a secondary winding of the transformer is connected to an input side of the rectifier circuit, and a DC side of the full bridge inverter circuit is a first side of the DC conversion module, and an output side of the rectifier circuit is a second side of the DC conversion module.

11. The DC-DC conversion system of claim 1, wherein each of the plurality of power conversion modules further comprises a first side and a second side, and the first sides of the plurality of power conversion modules are coupled in series, and the second sides of the plurality of power conversion modules are coupled in series.

12. The DC-DC conversion system of claim 1, wherein the controller is further configured to control a first gain crossover frequency of the first control signal higher than a second gain crossover frequency of the second control signals.

13. A method for controlling a DC-DC conversion system having a plurality of power conversion modules, a plurality of input sensors, an output sensor and a controller, wherein each of the plurality of power conversion modules has one or more conversion units, the method comprising:
  detecting, by the output sensor, an output signal of the DC-DC conversion system;
  detecting, by the plurality of input sensors, a plurality of input voltage signals located at a plurality of series-connected first sides of one or more conversion units respectively;
  receiving, by the controller, the output signal and the plurality of input voltage signals;
  generating, by the controller, a first control signal according to the output signal and an output reference signal;
  generating, by the controller, a plurality of second control signals according to the plurality of input voltage signals and a plurality of input reference voltage signals; and
  outputting, by the controller, a modulation signal corresponding to a corresponding second control signal of the plurality of second control signals, according to the first control signal and the corresponding second control signal, to control a plurality of switches of a corresponding conversion unit of the conversion units.

14. The method of claim 13, further comprising:
  subtracting, by a main controller of the controller, the output signal from the output reference signal to get an output error value, wherein the first control signal is obtained according to the output error value;
  subtracting, by each of a plurality of local controllers of the controller, a corresponding input voltage signal of the plurality of input voltage signals from a corresponding input reference voltage signal of the plurality of input reference voltage signals, which are received by each of the plurality of local controllers respectively, to get a voltage error value; and
  performing voltage-equalization, by the plurality of local controllers of the controller, according to a voltage error value of each local controller, to generate the corresponding second control signal.

15. The method of claim 13, further comprising:
  subtracting, by a main controller of the controller, the output signal from the output reference signal to get an output error value;
  generating, by a plurality of local controllers of the controller, the first control signal according to the output error value, and subtracting a corresponding input voltage signal of the plurality of input voltage signals from a corresponding input reference voltage signal of the plurality of input reference voltage signals, which are received by each of the plurality of local controllers respectively, to get a voltage error value correspondingly; and
  performing voltage-equalization, by the plurality of local controllers, according to the voltage error value of each local controller, to generate the corresponding second control signal.

16. The method of claim 13, further comprising:
  subtracting, by one of a plurality of local controllers of the controller, the output signal from the output reference signal, to get an output error value, wherein the first control signal is obtained according to the output error value;
  subtracting, by each of the plurality of local controllers of the controller, a corresponding input voltage signal of the plurality of input voltage signals from a corresponding input reference voltage signal of the plurality of input reference voltage signals, which are received by each of the plurality of local controllers respectively, to get a voltage error value correspondingly; and
  performing voltage-equalization, by the plurality of local controllers, according to the voltage error value of each local controller, to generate the corresponding second control signal.

17. The method of claim 13, further comprising:
  subtracting, by one of a plurality of local controllers of the controller, the output signal from the output reference signal, to get an output error value;
  generating, by the plurality of local controllers of the controller, the first control signal according to the output error value, and subtracting a corresponding input voltage signal of the plurality of input voltage signals from a corresponding input reference voltage signal of the plurality of input reference voltage signals, which are received by each of the plurality of local controllers respectively, to get a voltage error value correspondingly; and
  performing voltage-equalization, by the plurality of local controllers of the controller, according to the voltage error value of each local controller, to generate the corresponding second control signal.

18. The method of claim 14, further comprising:
  performing voltage-equalization, by the controller, to modify the corresponding second control signal, when one of the voltage error values of the plurality of local controllers is not higher than a first threshold value and not lower than a second threshold value; and
  maintaining, by the controller, the corresponding second control signal, when any of the voltage error values of the plurality of local controllers is neither higher than the first threshold value nor lower than the second threshold value.

19. The method of claim 14, further comprising:
receiving, by the plurality of local controllers of the controller, according to a time sequence of the main controller, the plurality of input voltage signals synchronously.

20. A decoupling method for a total output signal control loop and a voltage equalization control loop in a DC-DC conversion system, the total output signal control loop is configured to generate a first control signal, and the voltage equalization control loop is configured to generate a plurality of second control signals, the method comprising:
detecting, by a controller, the plurality of second control signals;
determining, by the controller, whether all of the plurality of second control signals are out of a coupling tolerance range; and
compensating, by the controller, the first control signal and the plurality of second control signals, when all of the plurality of second control signals are out of the coupling tolerance range, wherein a direction of the first control signal compensated by the controller is opposite from a direction of the plurality of second control signals compensated by the controller.

21. The method of claim 20, further comprising:
determining, by the controller, whether all of the plurality of second control signals are higher than a upper coupling tolerance limit or lower than a lower coupling tolerance limit;
subtracting, by the controller, a compensation value from each of the plurality of second control signals, and adding the compensation value to the first control signal, when all of the plurality of second control signals are higher than the upper coupling tolerance limit; and
adding, by the controller, the compensation value to each of the plurality of second control signals, and subtracting the compensation value from the first control signal, when all of the plurality of second control signals are lower than the lower coupling tolerance limit.

22. The method of claim 20, wherein the total output signal control loop can be a total output voltage control loop, a total output current control loop, or a total output power control loop.

23. The method of claim 20, wherein both of the first control signal and the plurality of second control signals are switch frequency, counter value, or duty cycle value.

24. The method of claim 20, wherein the first control signal is one of a switch frequency, counter value, or duty cycle value, and the plurality of second control signals are another one of the switch frequency, counter value, or duty cycle value.

* * * * *